US012081570B2

(12) United States Patent
Chiu et al.

(10) Patent No.: US 12,081,570 B2
(45) Date of Patent: Sep. 3, 2024

(54) CLASSIFICATION DEVICE WITH ADAPTIVE CLUSTERING FUNCTION AND RELATED COMPUTER PROGRAM PRODUCT

(71) Applicant: CyCarrier Technology Co., Ltd., New Taipei (TW)

(72) Inventors: Ming-Chang Chiu, New Taipei (TW); Ming-Wei Wu, New Taipei (TW); Pei-Kan Tsung, New Taipei (TW); Che-Yu Lin, New Taipei (TW); Cheng-Lin Yang, New Taipei (TW)

(73) Assignee: CyCarrier Technology Co., Ltd., New Taipei (TW)

( * ) Notice: Subject to any disclaimer, the term of this patent is extended or adjusted under 35 U.S.C. 154(b) by 220 days.

(21) Appl. No.: 17/867,066

(22) Filed: Jul. 18, 2022

(65) Prior Publication Data

US 2023/0032070 A1 Feb. 2, 2023

Related U.S. Application Data

(60) Provisional application No. 63/223,619, filed on Jul. 20, 2021.

(30) Foreign Application Priority Data

Jul. 12, 2022 (TW) .................................. 111126132

(51) Int. Cl.
*G06F 11/00* (2006.01)
*H04L 9/40* (2022.01)

(52) U.S. Cl.
CPC ...... *H04L 63/1425* (2013.01); *H04L 63/1416* (2013.01)

(58) Field of Classification Search
CPC ....................... H04L 63/1425; H04L 63/1416
(Continued)

(56) References Cited

U.S. PATENT DOCUMENTS

| 2011/0122153 | A1* | 5/2011 | Okamura | ............. G09B 29/106 345/629 |
| 2011/0185234 | A1* | 7/2011 | Cohen | ................. G06F 11/3476 714/E11.029 |

(Continued)

FOREIGN PATENT DOCUMENTS

| CN | 104917627 B | * | 6/2018 |
| JP | 2011113270 A | * | 6/2011 |

*Primary Examiner* — Haresh N Patel
(74) *Attorney, Agent, or Firm* — Andrew M. Calderon; Calderon Safran & Wright, PC

(57) ABSTRACT

The present invention provides a log classification system configured to perform a hierarchical similarity analysis operation according to a plurality of activities records to generate a discrete space metric tree, and perform a clustering operation on the discrete space metric tree to generate one or more event clusters associated with one or more suspicious event categories. The log classification system includes an output device configured to output the one or more event clusters to an information security incident diagnosis system, and allow the information security incident diagnosis system to calculate similar feature information and differential feature information of a plurality of activities records in the one or more event clusters as auxiliary information for diagnosing whether there are intrusions or abnormalities in a target network system.

10 Claims, 15 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2013/0022282 | A1* | 1/2013 | Cooper | G06V 10/75 |
| | | | | 382/225 |
| 2013/0250077 | A1* | 9/2013 | Kimura | H04N 9/8205 |
| | | | | 348/61 |
| 2014/0006871 | A1* | 1/2014 | Lakshmanan | G06F 11/079 |
| | | | | 714/37 |
| 2015/0235141 | A1* | 8/2015 | Rensing | G05B 23/0224 |
| | | | | 706/52 |
| 2015/0363409 | A1* | 12/2015 | Wood | G06F 16/583 |
| | | | | 707/738 |
| 2016/0210379 | A1* | 7/2016 | Lakshmanan | G16H 40/20 |
| 2021/0089420 | A1* | 3/2021 | Kitahara | G06F 11/3006 |
| 2021/0303381 | A1* | 9/2021 | Baldassarre | G06N 5/04 |

* cited by examiner

| | 1 | 2 | 3 |
|---|---|---|---|
| A | /insertdoc | {3A43E8C1-986F-48B6-B044-ADC17D1360D5}.xps | 851300 |
| B | /insertdoc | {074C5840-2405-4653-ACF4-400DE3827638}.xps | 858900 |
| NED (An, Bn) | 0 | 0.7 | 0.5 |

410

| | B0 | B1 | B2 | B3 |
|---|---|---|---|---|
| A0 | 0 | 1 | 2 | 3 |
| A1 | 1 | 0 | 1 | 2 |
| A2 | 2 | 1 | 1.4 | 2.4 |
| A3 | 3 | 2 | 2.4 | 2.4 |

CLASSIFICATION DEVICE WITH ADAPTIVE CLUSTERING FUNCTION AND RELATED COMPUTER PROGRAM PRODUCT

CROSS-REFERENCES TO RELATED APPLICATIONS

This application claims the benefit of US provisional application Ser. No. 63/223,619, filed on Jul. 20, 2021 and claims the priority of Patent Application No. 111126132 filed in Taiwan, R.O.C. on Jul. 12, 2022. The entirety of the above-mentioned patent applications are hereby incorporated by references herein and made a part of the specification.

BACKGROUND

Technical Field

The present invention relates to hack intrusion activity detection technologies, and in particular, to a high-efficiency data analysis method and structured data presentation method as an auxiliary diagnostic tool for network security vulnerabilities.

Related Art

With the increasing popularity of various network applications, hacking incidents emerge one after another everywhere. General antivirus software installed in a computer can detect and block common computer viruses, but it is usually difficult to effectively prevent or detect the intrusion of hackers. For example, a hacker attack method that has become increasingly popular in recent years, called "advanced persistent threat" (APT), will target a specially designated enterprise or organization to conduct persistent, advanced, and comprehensive attacks. This hacker attack method is usually a targeted attack sponsored by a specific country or organization, mainly for stealing specific intelligence, cryptocurrency, personal privacy of specific people, or the like. However, it is difficult for general information security protection software to detect such hacker attack.

Due to the variety of hacker attack methods, with current technologies, accurate determination cannot be made depending on computer programs only. In practice, in order to detect whether a specific environment has been attacked by the foregoing APT or other hacking methods, it is necessary to rely on experienced professional information security analysts to collect a large number of computer activities records in the detected environment and conduct subsequent manual analysis by using specific browsing and screening tools. However, in a large global business website system, the computer activities records have a quite large amount of data. The conventional manual analysis method will incur unpredictable time costs, and it is difficult for the conventional manual analysis method to detect system anomalies or intrusion threats in real time.

SUMMARY

In view of this, how to increase the analysis efficiency and accuracy of detecting whether a specific environment has been hacked is a problem to be resolved.

The present invention provides an information security incident diagnosis system for assisting in detecting whether a target network system has been hacked. The information security incident diagnosis system includes: an activities record collection device and a suspicious incident determination device. The activities record collection device is coupled to the target network system and is configured to collect a plurality of activities records associated with a plurality of computing devices in the target network system and process the plurality of activities records to generate return data. The suspicious incident determination device is configured to receive, through a network, the return data generated by the activities record collection device, acquire the plurality of activities records from the return data, generate a discrete space metric tree according to the plurality of activities records, and perform a clustering operation on the discrete space metric tree to generate one or more event clusters associated with one or more suspicious event categories. The suspicious incident determination device is further configured to perform single linkage clustering analysis on at least one event cluster and establish a guide tree corresponding to the event cluster to indicate a merging order from high to low similarity. The suspicious incident determination device is further configured to perform a graph generating operation on a plurality of activities records corresponding to the one or more event clusters in a recursive manner according to the merging order to generate a hierarchical directed acyclic graph (HDAG). The HDAG includes a hierarchical structure formed by connecting a plurality of common nodes and a plurality of branch nodes to correspondingly represent similar features and differential features of the plurality of activities records. The suspicious incident determination device includes a display device configured to display the HDAG as visual auxiliary information for diagnosing whether there are intrusions or abnormalities in the target network system. The discrete space metric tree includes a plurality of nodes, each node represents an activities record, and every two nodes are connected by an edge with a weighting coefficient. The suspicious incident determination device is further configured to perform a hierarchical similarity analysis operation to calculate a hierarchical edit distance (HED) between two to-be-analyzed activities records. The operation of generating the discrete space metric tree further includes: performing a hierarchical similarity analysis operation on two to-be-analyzed activities records corresponding to nodes at both ends of each edge in the discrete space metric tree to generate an HED; and setting the HED as a weighting coefficient of the edge. The hierarchical similarity analysis operation includes: interpreting the two to-be-analyzed activities records into a plurality of first tokens and a plurality of second tokens; calculating a normalized edit distance (NED) between each first token and each second token, the NED being a numerical value between 0 and 1; and calculating the HED of the two to-be-analyzed activities records according to the NED between each first token and each second token.

The present invention also provides embodiments of a computer program product allowing a suspicious incident determination device to perform an HDAG generating operation to generate one or more HDAGs as a basis for diagnosing whether a target network system has been hacked. The suspicious incident determination device includes a control circuit, a display device, and a communication circuit. The HDAG generating operation includes: receiving, by using the communication circuit through a network, return data generated by an activities record collection device and acquiring the plurality of activities records from the return data; generating, by using the control circuit, a discrete space metric tree according to the plurality of activities records, where the discrete space metric tree includes a plurality of nodes, each node represents an activities record, and every two nodes are connected by an edge with a weighting coefficient; performing, by using the control circuit, a clustering operation on the discrete space metric tree to generate one or more event clusters corresponding to one or more suspicious event categories; performing, by using the control circuit, single linkage clustering analysis on the one or more event clusters to establish a guide tree corresponding to the one or more event clusters, where the guide tree is configured to indicate a merging order from high to low similarity; performing, by using the control circuit, a graph generating operation on a plurality of activities records corresponding to the one or more event clusters in a recursive manner according to the merging order to generate an HDAG, where the HDAG includes a hierarchical structure formed by connecting a plurality of common nodes and a plurality of branch nodes to correspondingly represent similar features and differential features of the plurality of activities records; and displaying, by using a display device, the HDAG as a basis for diagnosing whether there are intrusions or abnormalities in the target network system. The operation of generating the discrete space metric tree further includes: performing a hierarchical similarity analysis operation on two to-be-analyzed activities records corresponding to nodes at both ends of each edge in the discrete space metric tree to generate an HED; and setting the HED as a weighting coefficient of the edge. The hierarchical similarity analysis operation includes: interpreting the two to-be-analyzed activities records into a plurality of first tokens and a plurality of second tokens; calculating an NED between each first token and each second token, the NED being a numerical value between 0 and 1; and calculating the HED of the two to-be-analyzed activities records according to the NED between each first token and each second token.

The present invention provides embodiments of a log classification device configured to adaptively cluster a plurality of activities records collected from a target network system. The plurality of activities records are respectively generated by a plurality of device activity reporting programs stored in a plurality of computing devices in the target network system, according to command lines received by the plurality of computing devices. The log classification device includes at least a communication circuit, a storage circuit, and a control circuit. The communication circuit is configured to receive the plurality of activities records through a network. The storage circuit can store a data analysis program. The control circuit couples the communication circuit and the storage circuit, and is configured to execute the data analysis program to generate a discrete space metric tree according to the plurality of activities records and perform a clustering operation on the discrete space metric tree to generate one or more event clusters associated with one or more suspicious event categories. The output device is configured to output the one or more event clusters and allow an information security incident diagnosis system to calculate similar feature information and differential feature information of a plurality of activities records in the one or more event clusters as auxiliary information for diagnosing whether there are intrusions or abnormalities in the target network system. The discrete space metric tree includes a plurality of nodes, each node represents an activities record, and every two nodes are connected by an edge with a weighting coefficient. The control circuit in the log classification device is further configured to perform a hierarchical similarity analysis operation to calculate an HED between two to-be-analyzed activities records. The control circuit in the log classification device is further configured to, when the discrete space metric tree is generated, perform a hierarchical similarity analysis operation on two to-be-analyzed tokens corresponding to nodes at both ends of each edge in the discrete space metric tree to generate an HED, and set the HED as a weighting coefficient of the edge. The hierarchical similarity analysis operation includes: interpreting the two to-be-analyzed activities records into a plurality of first tokens and a plurality of second tokens; calculating an NED between each first token and each second token, the NED being a numerical value between 0 and 1; and calculating the HED of the two to-be-analyzed activities records according to the NED between each first token and each second token.

The present invention also provides embodiments of a computer program product. The computer program product allows a log classification device to perform an adaptive data classification operation to generate auxiliary information for diagnosing whether there are intrusions or abnormalities in a target network system. The log classification device includes at least a control circuit, an output device, and a communication circuit. The adaptive data classification operation includes: receiving, by using the communication circuit through a network, a plurality of activities records generated by a plurality of device activity reporting programs according to command lines received by a plurality of computing devices; generating, by using the control circuit, a discrete space metric tree according to the plurality of activities records, where the discrete space metric tree includes a plurality of nodes, each node corresponds to an activities record, and every two nodes are connected by an edge with a weighting coefficient; performing, by using the control circuit, a clustering operation on the discrete space metric tree to generate one or more event clusters corresponding to one or more suspicious event categories; and outputting, by using the output device, the one or more event clusters, and allowing an information security incident diagnosis system to calculate similar feature information and differential feature information of a plurality of activities records in the one or more event clusters as auxiliary information for diagnosing whether there are intrusions or abnormalities in the target network system. The operation of generating the discrete space metric tree further includes: performing a hierarchical similarity analysis operation on two to-be-analyzed activities records corresponding to nodes at both ends of each edge in the discrete space metric tree to generate an HED; and setting the HED as a weighting coefficient of the edge. The hierarchical similarity analysis operation includes: interpreting the two to-be-analyzed activities records into a plurality of first tokens and a plurality of second tokens; calculating an NED between each first token and each second token, the NED being a numerical value between 0 and 1; and calculating the HED of the two to-be-analyzed activities records according to the NED between each first token and each second token.

The present invention further provides an event visualization device configured to generate one or more directed acyclic graphs (DAGs) that can be used as a basis for diagnosing whether a target network system has been hacked according to a plurality of activities records. The plurality of activities records pertain to an event cluster associated with a suspicious event category, and the event cluster is generated through a clustering operation of command lines received by a plurality of computing devices. The event visualization device includes at least a storage circuit, a control circuit, and a display device. The storage circuit is configured to store a graph generating program. The control circuit is coupled to the storage circuit, and is configured to execute the graph generating program and perform a graph generating operation on the plurality of activities records in a recursive manner to generate an HDAG, where the HDAG includes a hierarchical structure formed by connecting a plurality of common nodes and a plurality of branch nodes to correspondingly represent similar features and differential features of the plurality of activities records. The display device is coupled to the control circuit, and is configured to display the HDAG as a basis for diagnosing whether there are intrusions or abnormalities in the target network system. The graph generating operation includes: interpreting an activities record into a target DAG, where the target DAG includes one or more nodes, each node represents a token, and each token includes one or more characters; performing a hierarchical partial order alignment (HPOA) operation on the target DAG and a reference DAG to obtain a merging condition of each node; merging the target DAG and the reference DAG into the HDAG according to the merging condition; and using the HDAG as the reference DAG of a next HPOA operation.

The present invention further provides embodiments of a computer program product allowing an event visualization device to perform an HDAG generating operation to generate one or more HDAGs as a basis for diagnosing whether a target network system has been hacked. The plurality of activities records pertain to an event cluster associated with a suspicious event category, and the event cluster is generated through a clustering operation of command lines received by a plurality of computing devices. The event visualization device includes at least a control circuit and a display device. The HDAG generating operation includes: performing, by using the control circuit, a graph generating operation on the plurality of activities records in a recursive manner to generate an HDAG, where the HDAG includes a hierarchical structure formed by connecting a plurality of common nodes and a plurality of branch nodes to correspondingly represent similar features and differential features of the plurality of activities records; and displaying, by using the display device, one or more HDAGs as a basis for diagnosing whether there are intrusions or abnormalities in the target network system. The graph generating operation includes: interpreting an activities record into a target DAG, where the target DAG includes one or more nodes, each node represents a token, and each token includes one or more characters; performing an HPOA operation on the target DAG and a reference DAG to obtain a merging condition of each node; merging the target DAG and the reference DAG into the HDAG according to the merging condition; and using the HDAG as the reference DAG of a next HPOA operation.

One of the advantages of the above embodiments is that a large number of activities records are stored as an improved data storage structure by using a suspicious incident determination device, which can effectively reduce computing resources for subsequent data query, update, and classification, thereby improving the efficiency of data analysis.

Another advantage of the above embodiments is that an operation that can adaptively classify activities records is performed on the basis of the improved data storage structure, so that various unknown or new abnormal activities records are more likely to be found.

Another advantage of the above embodiments is that a visual presentation method is provided, and a large number of activities records are converted into DAGs with multiple levels of details to display similar features and differential features of the large number of activities records, helping information security analysts more easily determine abnormalities.

Other advantages of the present invention will be explained in more detail in conjunction with the following description and drawings.

BRIEF DESCRIPTION OF THE DRAWINGS

FIG. 4 shows an embodiment in which a similarity analysis module of the present invention calculates an HED for two activities records.

DETAILED DESCRIPTION

Figure 1:
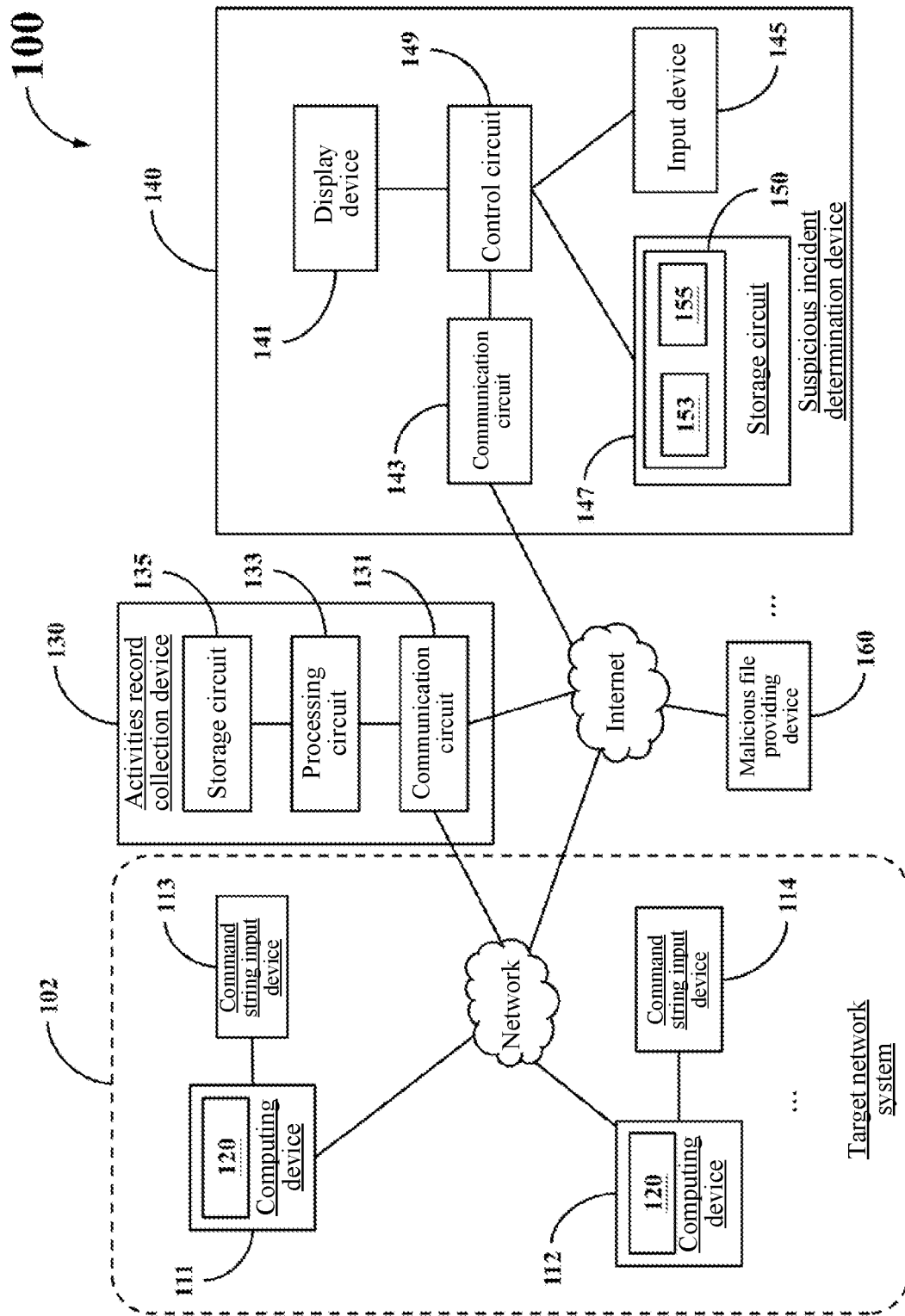
FIG. 1 is a simplified functional block diagram of an information security incident diagnosis system according to an embodiment of the present invention.

Embodiments of the present invention are described with reference to relevant drawings. The same reference numbers in the drawings represent the same or similar elements or method processes.

FIG. 1 is a simplified functional block diagram of an information security incident diagnosis system 100 according to an embodiment of the present invention. The information security incident diagnosis system 100 is configured to diagnose whether a target network system 102 has been hacked. As shown in FIG. 1, the target network system 102 includes a plurality of computing device (for example, computing devices 111-112 in FIG. 1). It is to be noted that the quantity of the computing devices shown in FIG. 1 is for illustration only, but is not intended to limit the quantity of the computing devices in the target network system 102 to a specific number.

In this specification and the claims, the term "computing device" refers to any electronic device that can run a specific operating system (such as Windows, Linux, macOS, Android, Chrome OS, or HarmonyOS) for operation and support proper data communication protocols, such as a desktop computer, a notebook computer, a tablet computer, a server, a network-attached storage (NAS), a smart television, a smartphone, or a smart speaker. The above data communication protocol may be any wired data transmission protocol or wireless data transmission protocol, such as a TCP/IP communication protocol, a user datagram protocol (UDP), a universal serial bus (USB) communication protocol, an IEEE 802.11-series communication protocol, or a Bluetooth-series communication protocol.

During actual application, the target network system 102 may be an intranet system for a company, school, research institute, or organization of any size, so the quantity of the computing devices in the target network system 102 may be a one-digit number, a two-digit number, a three-digit number, a four-digit number, or more. In addition, a plurality of computing devices in the target network system 102 may all be located in the same geographical area, or may be distributed in different geographical areas (for example, different cities or countries).

Each computing device in the target network system 102 may directly or indirectly perform various data communications with one or more other computing devices through a proper data transmission mechanism (for example, an intranet or data transmission line of the target network system 102). During operation, some computing devices in the target network system 102 may perform data communications by wired data transmission, and some other computing devices may perform data communications by wireless data transmission. In other words, different computing devices may use different data transmission methods. For example, the computing devices 111-112 may be coupled to command string input devices 113-114 respectively for receiving commands. The command string input devices 113-114 may be keyboards, console devices, or other human-computer interface devices. In other words, different computing devices may use different data transmission methods. For example, the computing devices 111-112 may be coupled to command string input devices 113-114 respectively for receiving commands. The command string input devices 113-114 may be keyboards, console devices, or other human-computer interface devices.

In the embodiment shown in FIG. 1, the information security incident diagnosis system 100 includes a plurality of device activity reporting programs 120, an activities record collection device 130, and a suspicious incident determination device 140.

The plurality of device activity reporting programs 120 in the information security incident diagnosis system 100 are respectively stored and installed in the plurality of computing devices 111-112 of the target network system 102, and are configured to generate a plurality of activities records associated with the plurality of computing devices 111-112. Hackers may remotely control the computing devices 111-112 through the Internet, or may directly control a terminal of the computing devices 111-112 through the command string input devices 113-114. Therefore, the device activity reporting program 120 may alternatively be configured to record command lines received through the computing devices 111-112 as one type of activities records. For example, the device activity reporting program 120 may record a command history log received in a command window or shell environment as a part of activities records. According to another aspect, when generating activities records, the device activity reporting program 120 may also record various ancillary information, such as time stamp, application name, user name, path resource, or network address, in the activities records for further analysis. In other words, the form and template of the activities record may vary according to the operating requirements of the computing devices 111-112. This is not limited in this embodiment.

The activities record collection device 130 includes a communication circuit 131, a processing circuit 133, and a storage circuit 135. The communication circuit 131 is coupled to the target network system 102, and is configured to perform data communications with the plurality of computing devices 111-112 through proper network connection (for example, the intranet or Internet of the target network system 102) to receive a plurality of activities records generated by the plurality of device activity reporting programs 120. The processing circuit 133 is coupled to the communication circuit 131, and is configured to control the operation of the communication circuit 131 and process the plurality of activities records received to generate return data. The processing circuit 133 also transmits the return data to the suspicious incident determination device 140 by using the communication circuit 131 through a proper network (for example, the Internet). The storage circuit 135 is coupled to the processing circuit 133, and is configured to store data or files required for the operation of the activities record collection device 130.

During actual application, the activities record collection device 130 may be installed inside a unit to which the target network system 102 pertains, or may be installed at other positions outside the unit to which the target network system 102 pertains.

As shown in FIG. 1, the suspicious incident determination device 140 includes a display device 141, a communication circuit 143, an input device 145, a storage circuit 147, and a control circuit 149. The display device 141 is configured to display various data and images. The communication circuit 143 is configured to receive the return data through a proper network (for example, the Internet). The input device 145 is configured to allow a user (for example, an information security analyst) of the suspicious incident determination device 140 to perform various operations on the suspicious incident determination device 140, such as inputting commands, modifying relevant analysis parameters, adjusting relevant data comparison standards, or adjusting the image size, image position, and image content in the display device 141. The storage circuit 147 is configured to store an information security analysis program 150. The information security analysis program 150 includes a data analysis module 153 and a graph generating module 155. The control circuit 149 is coupled to the display device 141, the communication circuit 143, the input device 145, and the storage circuit 147, and is configured to capture a plurality of activities records associated with the plurality of computing devices 111-112 in the target network system 102 from the return data received by the communication circuit 143. The control circuit 149 is further configured to execute the data analysis module 153 of the information security analysis program 150, generate a discrete space metric tree according to the plurality of activities records, and perform a clustering operation on the discrete space metric tree to generate one or more event clusters associated with one or more suspicious event categories. The control circuit 149 is further configured to execute the graph generating module 155 of the information security analysis program 150 and convert the one or more event clusters into an HDAG that can represent similar features and differential features of the plurality of activities records. According to another aspect, the graph generating module 155 may also allow the control circuit 149 to display, by using the display device 141, the HDAG as a basis for diagnosing whether there are intrusions or abnormalities in the target network system (102).

According to another aspect, the suspicious incident determination device 140 may generate the HDAG by performing a graph generating operation on the plurality of activities records in the one or more event clusters in a recursive manner. Further, the suspicious incident determination device 140 merges the one or more event clusters into an order of the HDAG in a recursive manner, which may be performed according to a guide tree established by single linkage clustering analysis. A detailed implementation will be described in detail later.

In addition, an exemplary malicious file providing device 160 in FIG. 1 represents a phishing website, a zombie computer, a network springboard, a web server that distributes malicious code, or one of various device entities that play a similar role that may be used by hackers in the process of invading the target network system 102. In actual hacking, hackers may attempt to attack the target network system 102 through more malicious file providing devices.

In practice, the above communication circuits 131 and 143 may be implemented by various wired transmission circuits, wireless transmission circuits, or hybrid circuits obtained by integrating the two communication mechanisms. The processing circuit 133 may be implemented by one or more processor units. The storage circuits 135 and 147 may be implemented by various non-volatile storage devices. The display device 141 may be implemented by various screens or projection devices that can display images. The input device 145 may be implemented by a keyboard, a mouse device, a remote control, a touch screen, a touchpad, a button, a voice-activated input device, a gesture sensing device, a circuit using various other command generating techniques, or a combination of the above devices. The control circuit 149 may be implemented by a single processor module, a combination of a plurality of processor modules, a computer system, a server, or a cloud system. In addition, the display device 141 and the input device 145 may be integrated together into a single touch screen or a combination of a plurality of touch screens.

The functions provided by the data analysis module 153 of the information security analysis program 150 in FIG. 1 are described below with reference to FIG. 2.

Figure 2:
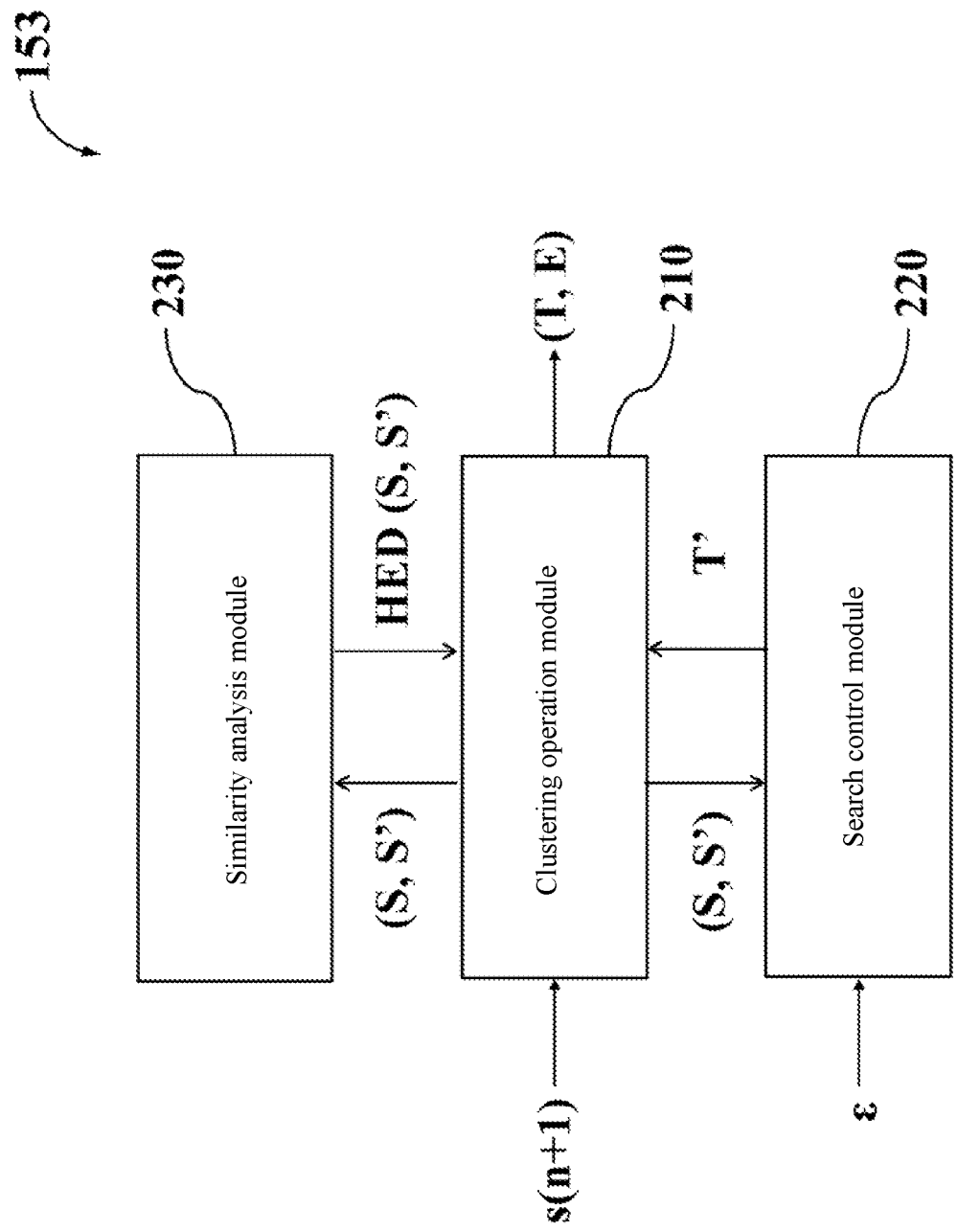
FIG. 2 is a schematic diagram of functional modules of an event analysis program in FIG. 1.

FIG. 2 is a schematic diagram of functional modules of the data analysis module 153 in FIG. 1. The data analysis module 153 mainly includes three functional modules: a clustering operation module 210, a search control module 220, and a similarity analysis module 230. The operation basis of these three functional modules is a discrete space metric tree improved from a Burkhard-Keller (BK) tree.

The BK-tree is a data structure, designed based on the principle of edit distance (Levenshtein distance), usually suitable for natural language processing or approximate word matching. The BK-tree is mainly composed of a plurality of nodes and edges. Each node represents a word and may be connected to other nodes through one or more edges. Each edge is assigned a weighting coefficient for representing an edit distance (ED) between nodes at both ends of the edge. Each node may be connected to one or more edges, but the weighting coefficients of these edges are not repeated. When a large number of words are stored as a BK-tree structure, the BK-tree structure can be efficiently used to query the closest similar word for a new word. Whether it is querying a word or adding a new word to a BK-tree, it is necessary to perform an ED operation on each node starting from a root node and recursively perform the ED operation on a next node along an edge that meets a result of the ED operation. In a conventional ED operation method, a combination with a minimum total value of replacement costs is found from possible replacement combinations of all characters in two words, and the total value of replacement costs of the combination is used as the ED of the two words. The replacement costs of every two characters include three possible numerical values:

When a first character is replaced with blank, or blank is replaced with a second character, the replacement costs are 1.

When the first character is replaced with the second character, the replacement costs are 2.

When the first character is the same as the second character, the replacement costs are 0.

Therefore, the weighting coefficient recorded in each edge of the BK-tree, that is, the replacement costs of every two words, is a total value of replacement costs of an optimal replacement combination of all characters in the two words, which will be an integer value with no upper limit.

In the embodiments of this application, a clustering operation module 210 is provided, configured to convert a large number of activities records received by the suspicious incident determination device 140 from the target network system 102 or the activities record collection device 130 into a discrete space metric tree for storage, and provide functions of adding new nodes and adaptive clustering. Each activities record is usually a line of text including one or more words. For example, an activities record may be used for representing a line of command line, each line of command line is usually composed of a main command word and one or more execution parameters, and every two execution parameters are separated by a blank character. According to the convention in the field of natural language processing, in this embodiment, each word in each line of text is referred to as a token.

In the discrete space metric tree provided in this embodiment, an activities record included in each node is actually one or more tokens of varying length. In this embodiment, the similarity analysis module 230 provides a standardized calculation method for a weighting coefficient between nodes. The similarity analysis module 230 may receive two input values and output an HED of the two input values obtained through operation. The clustering operation module 210 may calculate a weighting coefficient of each edge in a discrete space metric tree by using the similarity analysis module 230.

For example, when the data analysis module 153 receives a request for adding a new activities record to add an $(n+1)^{th}$ activities record $S(n+1)$ to a discrete space metric tree with n activities records, the clustering operation module 210 assigns the activities record $S(n+1)$ as a target node S and assigns a root node of the discrete space metric tree as a reference node S'. The clustering operation module 210 substitutes activities record values in the target node S and the reference node S' into the similarity analysis module 230 to obtain an HED(S,S'). The clustering operation module 210 assigns a next node connected to an edge with the HED(S,S') as a weighting coefficient as the reference node S', substitutes the reference node S' into the similarity analysis module 230 for operation, and repeats the substitution for subsequent searching. When traversing to a certain node and finding out no edge with a weighting coefficient that meets the HED(S,S'), the clustering operation module 210 adds a new edge to connect the node to the target node S and assigns the HED(S,S') as a weighting coefficient of the new edge. The similarity analysis module 230 is a key operation module repeatedly used in the data analysis module 153. Its detailed operation will be described in FIG. 3.

According to another aspect, the clustering operation module 210 provided in this embodiment further provides a function of adaptive clustering. When receiving a new activities record S(n+1), the data analysis module 153 may process the new activities record by using the clustering operation module 210 and may also perform a clustering operation by using the search control module 220. The clustering operation includes a series of recursive search processes. In the processes, neighbor edges will be newly added to connect the activities record S(n+1) to all nodes with similarities that meet the condition, so that all the nodes connected to the neighbor edges form a cluster. In the process of traversal searching, the search control module 220 may assist in determining edges that need to be searched down and edges that do not need to be searched down, so as to reduce the computational complexity of searching in the discrete space metric tree and accelerate the operation of establishing a cluster. The search control module 220 may receive the target node S and the reference node S' as an input value, and determine which edges on the reference node S' in the discrete space metric tree are the edges that need to be searched down after an operation of discrete triangle inequality is performed. The search control module 220 outputs the edges that need to be searched as a queue T' and allows the clustering operation module 210 to complete the operation of traversal searching recursively according to the queue T'.

After completing the clustering operation on a target node S, the clustering operation module 210 may output a set of information (T,E) and store it in the storage circuit 147. T is an updated discrete space metric tree, and E is a set of all node or neighbor edge information of an event cluster.

The clustering in this embodiment includes the following advantages: The operation mode is completely determined by the similarity index of the target node and the reference node without setting a fixed template or condition in advance. Therefore, the resultant obtained through the clustering is adaptive and can react instantly to any unknown attacks. The search control module 220 is also a key operation module heavily and repeatedly used in the data analysis module 153. During the operation, the similarity analysis module 230 is also heavily and repeatedly used to calculate the HED. The detailed operation will be described in FIG. 5.

Figure 3:
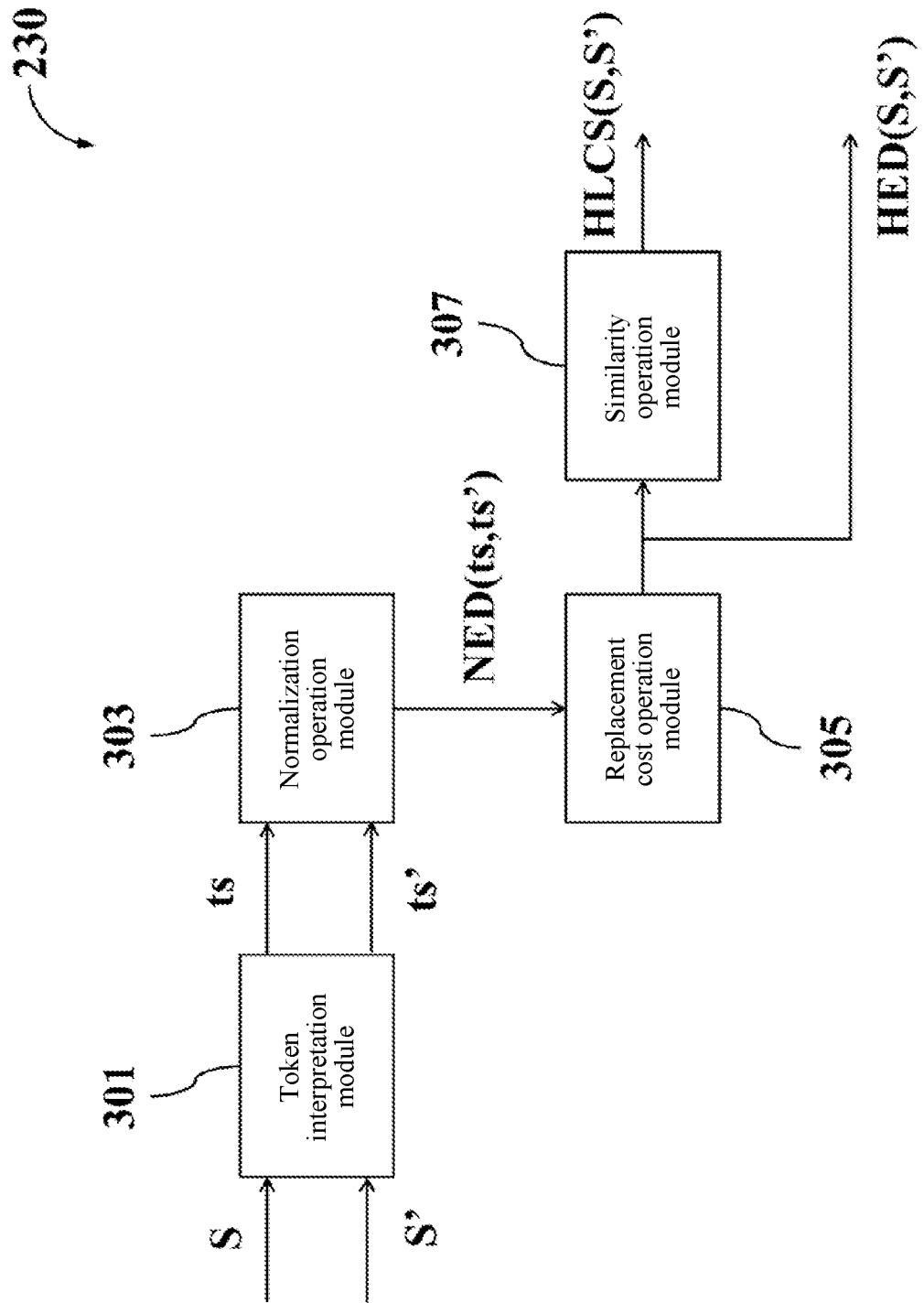
FIG. 3 is a schematic diagram of functional modules of a similarity analysis module in FIG. 2.

FIG. 3 is a schematic diagram of functional modules of the similarity analysis module 230 in FIG. 2. The functions of the similarity analysis module 230 mainly include a token interpretation module 301, a normalization operation module 303, a replacement cost operation module 305, and a similarity operation module 307. The similarity analysis module 230 may receive two to-be-analyzed activities records (S,S'), and output an HED(S,S') and a hierarchical longest common sub-sequence (HLCS)(S,S') of the two to-be-analyzed activities records (S,S') after a hierarchical similarity analysis operation cooperatively performed by the token interpretation module 301, the normalization operation module 303, the replacement cost operation module 305, and the similarity operation module 307.

When the similarity analysis module 230 receives the two to-be-analyzed activities records (S,S'), the token interpretation module 301 performs token interpretation. The first activities record S and the second activities record S' are interpreted into a plurality of first tokens ts and a plurality of second tokens ts'. For example, an activities record represents a line of command line, each line of command line is usually composed of a main command word and one or more execution parameters, and every two execution parameters are separated by a blank character. The token interpretation module 301 may separate the main command word and the execution parameters into a plurality of independent tokens with a blank character as a separator according to a common command line grammar rule. The main command word may usually be a file name of an executable or installation file, or even including a path address. In some specific cases, the token interpretation module 301 may choose to discard the path address in the main command word, and only leave a simple file name, so as to reduce the burden of analysis.

After the token interpretation module 301 interprets the two to-be-analyzed activities records (S,S') into the plurality of first tokens ts and the plurality of second tokens ts', the normalization operation module 303 calculates an NED between each first token ts and each second token ts', the NED being a numerical value between 0 and 1. For example, if the first activities record S includes m first tokens ts and the second activities record S' includes n second tokens ts', the normalization operation module 303 will calculate m*n NEDs(ts,ts').

The NED is a metric unit defined in this application to express the replacement costs between two tokens with an index value in a fixed range. The NED provided in this embodiment is defined as follows:

$$NED(w1, w2) = \frac{2}{\pi} \cos^{-1}\left(\frac{|w1| + |w2| - ED(w1, w2)}{2\sqrt{|w1| \cdot |w2|}}\right) \quad (1)$$

w1 represents a first token including one or more characters, and w2 represents a second token including one or more characters.

|w1| or |w2| represents a length of the first token or the second token, that is, a quantity of the characters.

ED(w1,w2) represents an ED of the first token and the second token. The ED and LCS have the dual property.

$$ED(w1,w2)=|w1|+|w2|-2LCS(w1,w2) \quad (2)$$

The LCS represents a common character sequence between two tokens, which can be discontinuous, but cannot be changed in order. In other words, a length of the LCS may be used as a similarity index between two tokens. Because the algorithm of the ED and LCS between tokens is already known, the calculation methods are not described herein.

It can be understood from formulas (1) and (2) that a length of two tokens and a length of the LCS may form a triangle in a two-dimensional space, which is essentially equivalent to an inner product of two token vectors. In the embodiments of this application, an included angle between the two token vectors is inversely deduced through an arccosine function and translated into a real value ranging from 0 to 1, so as to exclude the influence of the difference in token length on the edge weight, making subsequent applications more accurate. In other words, the normalization operation module 303 runs formula (1) to calculate an LCS value of each first token and each second token and a root of a product of the number of characters of each first token and each second token, and finally obtains the NED according to an arccosine function of a ratio of the LCS value to the root of a product of character numbers.

After receiving all NEDs calculated by the normalization operation module 303, the replacement cost operation module 305 may perform an operation similar to a conventional ED operation to find out the HED. For example, the HED of every two characters includes three possible numerical values:

When a first character w is replaced with blank, or blank is replaced with a second character w', the normalization replacement costs are defined as 1;

when the first character w is replaced with the second character w', the normalization replacement costs are defined as twice the NED(w,w'); and when the first character w is the same as the second character w', the normalization replacement costs are 0.

The replacement cost operation module 305 may find out a replacement combination with minimum total normalization replacement costs from all possible replacement combinations of the plurality of first tokens and the plurality of second tokens, and assign the minimum total normalization replacement costs as the HED(S,S') of the two to-be-analyzed activities records (S,S'). The replacement cost operation module 305 finally outputs the HED(S,S') to facilitate relevant operations of the discrete space metric tree.

Further, in this embodiment, a sentence-level similarity index is also defined as a length of an HLCS according to the definition of the HED. There is also a dual property between the HLCS length and the HED.

$$HLCS(S, S') = \frac{1}{2}(|S| + |S'| - HED(S, S'))  \quad (3)$$

S represents a first activities record including one or more tokens, and S' represents a second activities record including one or more tokens.

|S| or |S'| represents a length of the first activities record or the second activities record, that is, a total character number.

The similarity operation module 307 converts the HED outputted by the replacement cost operation module 305 into the HLCS length according to formula (3) as a standardized similarity index between two activities records. For example, the similarity operation module 307 subtracts the HED of the two to-be-analyzed activities records from a total character number of the two to-be-analyzed activities records and divides the resultant by 2, so that a similarity index of the two to-be-analyzed activities records can be obtained.

In this embodiment, the calculation method of the defined HED includes the following advantages. The activities records in the target network system 102 are usually command lines with an unfixed length and randomly changed content. Therefore, in this embodiment, each activities record is first separated into tokens for a word-level normalization operation and then subjected to a sentence-level two-stage operation. Compared with the conventional ED operation, this embodiment significantly improves the recognition of data differences and can effectively reduce the computational complexity.

FIG. 4 shows an embodiment in which the similarity analysis module 230 of the present invention calculates an HED for two activities records.

A command lines analysis table 410 expresses two activities records A and B. The activities records may be respectively interpreted into tokens A1, A2, A3 and tokens B1, B2, B3 through the token interpretation module 301. Then, according to the embodiment of the normalization operation module 303, NED(An,Bn) between every two corresponding tokens may be obtained. For example, NED(A1,B1)=0;
NED(A2,B2)=0.7; and
NED(A3,B3)=0.5.

According to the embodiment of the replacement cost operation module 305, the tokens A1, A2, A3 in the activities record A and the tokens B1, B2, B3 in the activities record B may be analyzed by using a replacement cost array 420, so as to gradually find out an optimal path and accumulate replacement costs. The analysis logic of the replacement cost array 420 is similar to that of the conventional ED operation, except that the replacement costs between every two tokens is calculated using the NED. In FIG. 4, a path 422 represents an optimal accumulation path from (A1,B1) to (A2,B2), and a path 424 represents an optimal accumulation path from (A2,B2) to (A3,B3). The NED(A2,B2) is 0.7, so total replacement costs accumulated from (A1,B1) to (A2,B2) are 0+0.7×2=1.4. Similarly, the NED(A3,B3) is 0.5, so normalized replacement costs of (A3,B3) are 2×0.5=1, and total replacement costs accumulated to (A3,B3) are 1.4+1=2.4. The total replacement costs are 2.4 after all operations are outputted as the HED of the activities records A and B.

The embodiment in FIG. 4 further describes the following advantages. An original activities record is separated into a plurality of short tokens, and each token is a meaningful word that meets a natural language principle or a computer instruction rule. Therefore, the NED value calculated is also more analytically meaningful than the similarity value of random strings, and finally the HED value obtained by adding up can also retain the recognizability of the original sentence structure. In addition, the operation of each NED only needs to process relatively short tokens, resulting in a small computational complexity. If the similarity analysis module 230 can complete a large number of light-loaded NED operations together with the parallel computing technology of a computer in a short time, the performance of the overall HED operation is exponentially improved.

Figure 5:
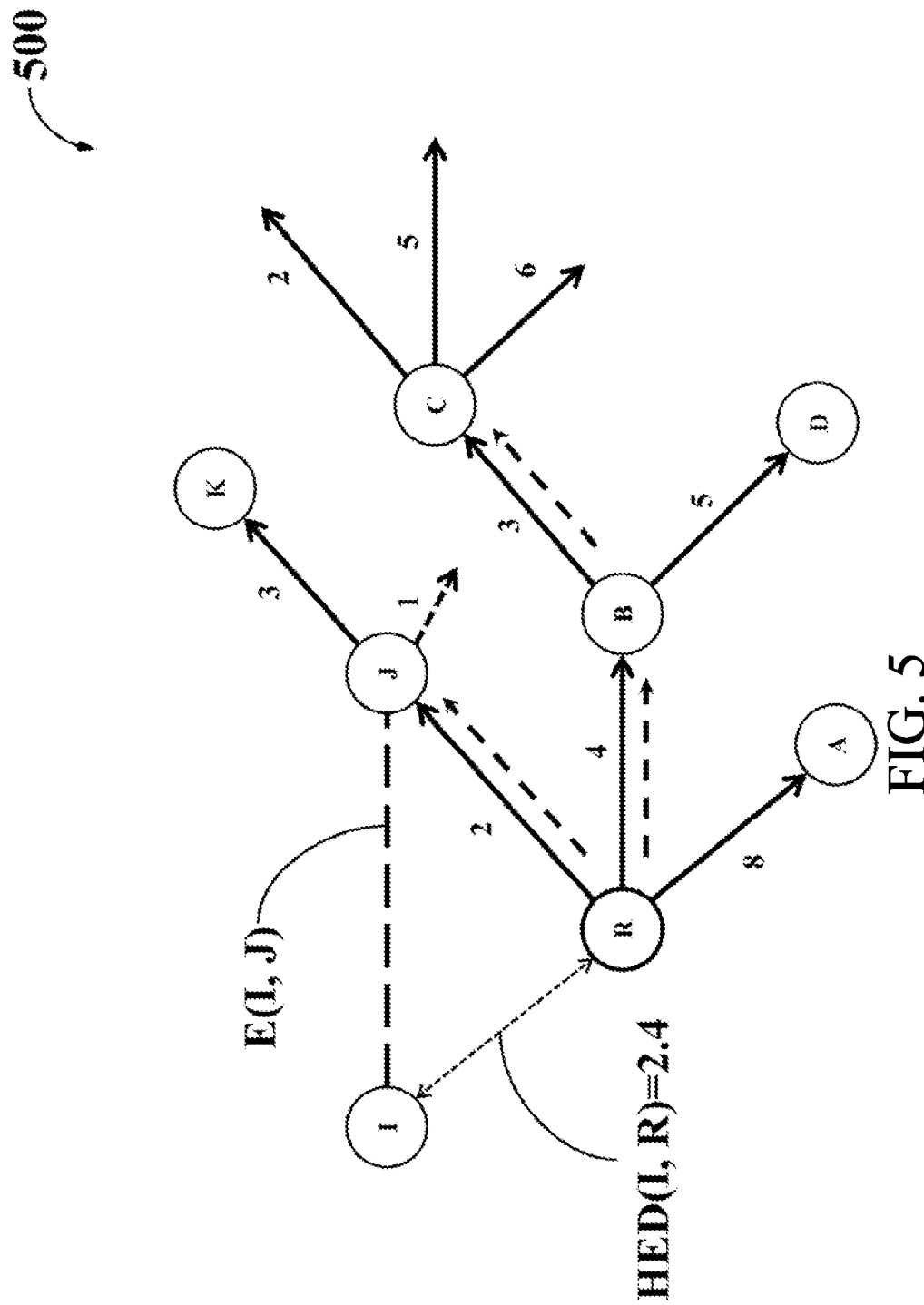
FIG. 5 shows an embodiment of a discrete space metric tree and an embodiment of a clustering operation.

FIG. 5 shows an embodiment of a discrete space metric tree 500 and an embodiment of a clustering operation.

In FIG. 5, the discrete space metric tree 500 includes a plurality of nodes, and every two nodes are connected by an edge. In this embodiment, each node represents an activities record, and each activities record may include one or more tokens. A weighting coefficient on each edge is an HED calculated by the similarity analysis module 230.

The HED calculated by the similarity analysis module 230 may be a floating-point number. However, when the clustering operation module 210 establishes the discrete space metric tree 500, considering the structural balance of the tree, the weighting coefficient of an edge has to be a discrete value that is not continuous, such as an integer. Therefore, when setting a weighting coefficient for each edge by using the similarity analysis module 230, the clustering operation module 210 may convert the HED into an integer value by rounding down or rounding, and then set the integer value as the weighting coefficient of the edge. When performing an addition or query operation on a new node, the clustering operation module 210 also processes HED values of the new node and each node in the discrete space metric tree 500 according to the same rules of rounding down or rounding.

FIG. 5 may be used to describe an example in which a node I is added in the discrete space metric tree 500. The discrete space metric tree 500 has a root node R. When the data analysis module 153 receives a newly added activities record S(n+1), the activities record S(n+1) is regarded as a new node I, and the clustering operation module 210 will perform a task of adding the new node I into the discrete space metric tree 500. Starting from the root node R, the clustering operation module 210 assigns the root node R as a reference node. The clustering operation module 210 may calculate a weighting coefficient of each edge in a discrete space metric tree by using the similarity analysis module 230. For example, the clustering operation module 210 calculates an HED of the new node I and the reference node by using the similarity analysis module 230 to obtain HED(I,R)=2.4. In the embodiment in FIG. 5, the root node R includes three edges respectively with the weighting coefficients 2, 4, and 8, correspondingly pointing to downstream nodes J, B, and A. The HED(I,R) of the new node I and the root node R is subjected to the rounding operation, and the resultant meets the edge with the weighting coefficient 2. Therefore, the clustering operation module 210 assigns the corresponding downstream node J as a new reference node, and calculates an HED of the new node I and the node J by using the similarity analysis module 230. This is repeated accordingly. The node J in FIG. 5 has only one downstream edge with a weighting coefficient 3. If the resultant obtained after rounding the HED of the new node I and the node J meets the weighting coefficient 3, the clustering operation module 210 assigns the reference node as the corresponding downstream node K and repeats the above steps. If the resultant obtained after rounding the HED of the new node I and the node J does not meet the weighting coefficient 3 but a different value such as 1, the clustering operation module 210 adds an edge with a weighting coefficient 1 for the node J and connects the node I to the edge to be the downstream of the node J. Therefore, the node I is added to the discrete space metric tree 500.

FIG. 5 may also be used to describe an embodiment in which a clustering operation is performed in the discrete space metric tree 500. Similarly, a new node I is used as an example. When the data analysis module 153 receives a newly added activities record S(n+1), the activities record S(n+1) is regarded as a new node I. In this embodiment, the new node I is also referred to as a target node. The clustering operation module 210 will add an edge that meets a search range to a search queue by using the search control module 220 to facilitate the clustering operation. First, the clustering operation module 210 assigns, starting from a root node R of the discrete space metric tree, the root node R as a reference node. Then, the clustering operation module 210 calculates an HED and an HLCS length corresponding to the target node and the reference node by using the similarity analysis module 230. In this embodiment, the HED may be substituted into a discrete triangle inequality to determine the search range. The HLCS length is used to determine a similarity condition.

In this embodiment, a discrete triangle inequality is defined to determine a search range:

$$HED(S,S')-\varepsilon-1 \leq K_e \leq HED(S,S')+\vartheta \quad (4)$$

HED(S,S') represents the HED of the target node and the reference node;

$K_e$ represents a weighting coefficient of an edge in the discrete space metric tree; and $\varepsilon$ is defined as an expected similarity value. For example, if it is desired to find out a node with an HED from the target node less than 2, the expected similarity value $\varepsilon$ is defined as 2. In an embodiment, the expected similarity value $\varepsilon$ may be defined as a length |S| of an activities record corresponding to the target node itself, such as a quantity of tokens or a total quantity of characters.

This discrete triangle inequality may be understood as a method for accelerating search. When searching for objects similar to the target node in the discrete space metric tree, it is only necessary to search down edges with a weighting coefficient that meets this search range. Edges with a weighting coefficient that does not meet this search range may be directly omitted and not processed.

For example, when the search starts from the root node R, an upper limit of the search range is the HED(I,R) of the new node I and the root node R plus the length of the new node I; and a lower limit of the search range is the HED(I,R) of the new node I and the root node R minus the length of the new node I minus 1. The reason why formula (4) is called the "discrete" triangle inequality is that the weighting coefficient of the edge in the discrete space metric tree is a discrete value obtained by rounding down. Therefore, the calculation of the lower limit of the search range also needs an operation of subtraction by 1, so as to cover a non-integer range that is rounded from the HED. If the expected similarity value $\varepsilon$ is defined as 2 and the HED(I,R) is 2.4, an upper limit of the search range is 4.4, and a lower limit of the search range is −0.4. In the downstream edges of the root node R, there are two edges that meet the search range, which have the weighting coefficients of 2 and 4 respectively and have corresponding downstream nodes J and B respectively. As a result, the search control module 220 adds the nodes J and B to a search queue and assigns the nodes J and B as reference nodes in order to repeat the above search.

In another example, when searching to the node B, the clustering operation module 210 calculates a next search range according to the node I and the node B. In two downstream edges of the node B, only the edge with a weighting coefficient of 3 meets the search range, so the search control module 220 adds a node C connected to the edge to the search queue to allow the clustering operation module 210 to search down recursively in order. The edge with a weighting coefficient of 5 is omitted and not processed because it does not meet the search range.

In this embodiment, the defined discrete triangle inequality has the following advantages. The setting of the expected similarity value $\varepsilon$ can help effectively converge the search computational complexity and quickly establish a cluster with all nodes that meet the condition.

If the HLCS length of the reference node and the target node meets a similarity condition, the clustering operation module 210 may establish a neighbor edge to connect the reference node and the target node.

In this embodiment, the following similarity condition is defined:

$$HLCS(S, S') \geq \frac{1}{2}\max\{|S|, |S'|\} \quad (5)$$

Formula (5) may be understood as that when the HLCS length of the two activities records S and S' is greater than half the length of the longer activities record, the two activities records meet the similarity condition.

In FIG. 5, when comparing the new node I with the node J, it is found that the HLCS length of the new node I and the node J meets the similarity condition, then the clustering operation module 210 establishes a neighbor edge E(I,J) for the new node I and the node J and marks the HLCS length of the new node I and the node J on the neighbor edge. After processing all nodes in the search queue, the clustering operation module 210 may generate a plurality of neighbor edges E that meet the similarity condition. Therefore, the clustering operation module 210 records a set of these neighbor edges E as the same cluster.

In this embodiment, the defined clustering operation has the following advantages. The process of substituting the new node I into the discrete space metric tree 500 to search repeatedly utilizes the search control module 220 and the similarity analysis module 230 in the data analysis module 153 to accelerate operation. Based on the improved structure of the discrete space metric tree 500, the effects of adding nodes, querying nodes, and clustering can be achieved in a single operation. In a further embodiment, the clustering operation module 210 may also mark a cluster to which each node in the discrete space metric tree 500 pertains and directly include a node that meets the similarity condition from newly added nodes a corresponding cluster, so as to save subsequent search operations. It can be learned from formulas (4) and (5) that the clustering operation in this embodiment needs no templates set in advance. The clustering operation module 210 can adaptively classify a large number of activities records that meet the similarity condition as a cluster based on the characteristic of the HED with the setting of the expected similarity value c.

Figure 6:
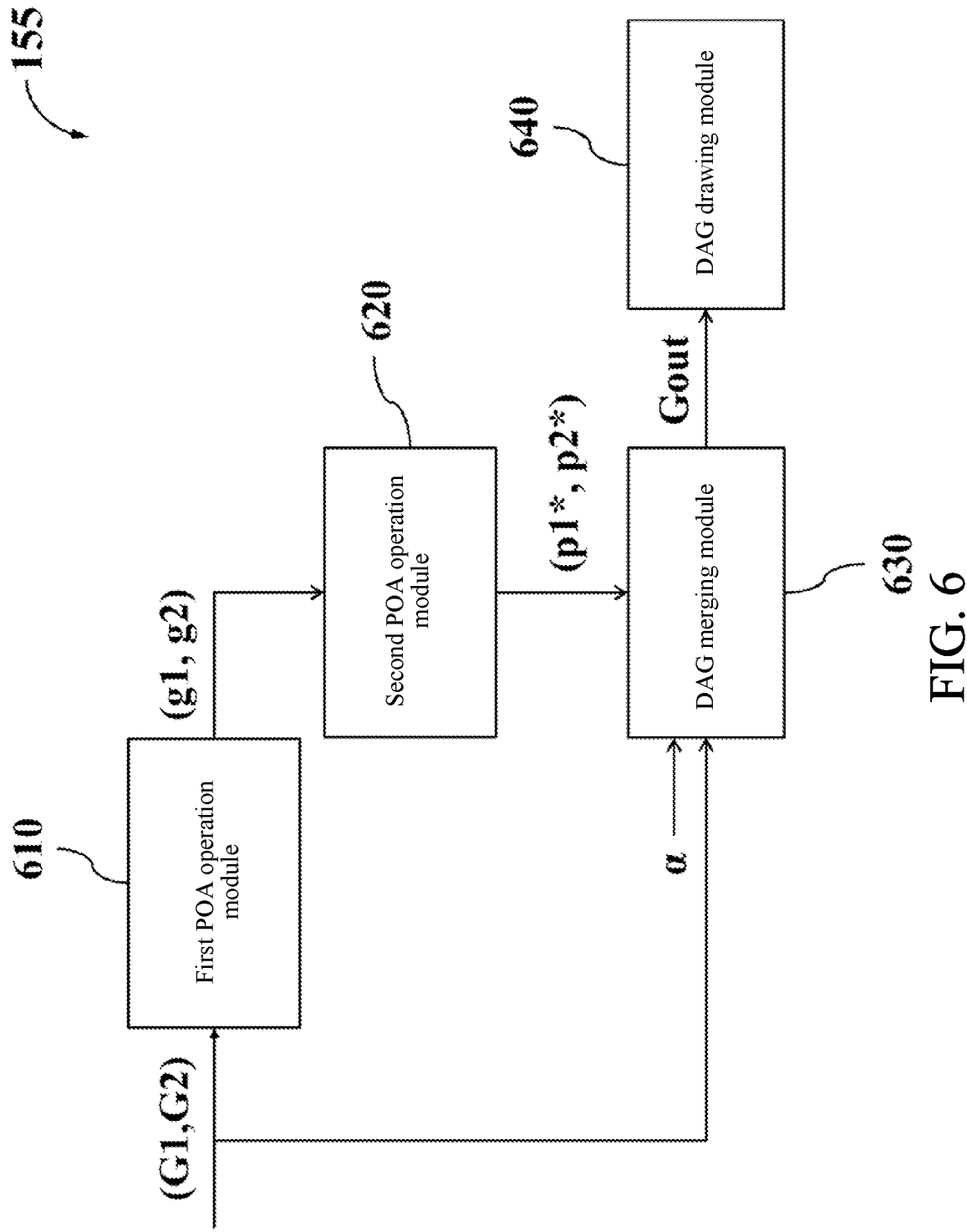
FIG. 6 is a schematic diagram of functional modules of a graph generating module in FIG. 1.

FIG. 6 is a schematic diagram of functional modules of the graph generating module 155 in FIG. 1. After completing data processing, the data analysis module 153 generates a cluster corresponding to various suspicious event categories and stores it in the storage circuit 147. The graph generating module 155 further visualizes the event cluster stored in the storage circuit 147, so that information security workers can easily analyze and determine an intrusion event.

The graph generating module 155 mainly provides a graph generating operation of an HDAG. In an embodiment, the graph generating module 155 includes a first POA operation module 610, a second POA operation module 620, a DAG merging module 630, and a DAG drawing module 640. The graph generating module 155 receives two DAGs as an input value, performs an HPOA operation, and outputs a merged DAG Gout. The merged DAG Gout may also be iteratively used as an input value for a next HPOA operation. The recursion is performed based on the above, all activities records in an event cluster may be finally drawn into an HDAG with a multi-hierarchical structure for presenting the same features and different features of the overall data.

For example, each event cluster includes a plurality of activities records. Each activities record is structurally equivalent to a single-chain DAG. In order to sequentially add each activities record in an event cluster into the HDAG, the graph generating module 155 may process each node in the event cluster in a specific order.

In this embodiment, the HPOA operation includes two stages. The first stage is a first POA operation performed by the first POA operation module 610, and the second stage is a second POA operation performed by the second POA operation module 620.

The DAG merging module 630 performs a conditional merging operation on nodes added to the operation according to a result of the HPOA operation. Finally, the DAG drawing module 640 draws a result of the merging operation into an HDAG.

In practice, the first POA operation module 610 performs the POA operation at the first stage on two inputted DAGs (G1,G2), and the second POA operation module 620 performs the POA operation at the second stage on a product of the POA operation at the first stage. For brevity of description, in this embodiment, the two inputted DAGs (G1,G2) are respectively referred to as a target DAG G1 and a reference DAG G2.

The first POA operation module 610 performs the first POA operation on the target DAG G1 and the reference DAG G2 to find out information of nodes aligned in the target DAG G1 and the reference DAG G2, such as one or more aligned node groups (g1,g2). The first POA operation module 610 performs the first POA operation with tokens as an alignment unit.

The reference DAG G2 may be the DAG Gout generated from a previous merging operation of the DAG merging module 630. If the first POA operation module 610 performs a first operation, the reference DAG G2 may be another DAG obtained by converting another activities record in the event cluster.

In a conventional POA operation, character replacement costs between every two tokens are calculated by using an LCS algorithm. Each DAG may be decomposed into a plurality of paths P from a head node to an end node. The POA operation is to find out an optimal path pair (P1*, P2*) with an optimal LCS score from all possible path combinations (P1,P2) of two DAGs.

When performing the first POA operation, the first POA operation module 610 calculates sentence-level replacement costs with tokens as a minimum node unit. Therefore, this embodiment defines a normalized LCS (NLCS) as a metric unit:

$$NLCS(P1^*, P2^*) = \frac{2}{\pi}\sin^{-1}\left(\frac{|LCS(P1^*, P2^*)|}{\sqrt{|P1^*||P2^*|}}\right) = 1 - NED(P1^*, P2^*) \quad (6)$$

According to formula (6), after finding out an optimal path pair (P1*,P2*) with an optimal LCS score from all possible path combinations, the first POA operation module 610 performs an arcsine function operation on a ratio of the LCS value to a root of a length product of the optimal path pair (P1*,P2*) to obtain a normalized real value ranging from 0 to 1 as an NLCS of the optimal path pair (P1*,P2*). According to another aspect, the two paths P1* and P2* may be regarded as spatial vectors, and the LCS may be regarded as an inner product of the two spatial vectors. In order to express the directly proportional relationship between the similarity and the LCS, formula (6) adopts an arcsine function to redefine an included angle between the two spatial vectors as a normalized value between 0 and 1.

In the first POA operation, the first POA operation module 610 finds out the optimal path pair (P1*,P2*) with the highest replacement score from all possible path combinations in the target DAG G1 and the reference DAG G2 by using the NLCS length in formula (6) as a metric unit of the replacement score. The optimal path pair (P1*,P2*) may include a plurality of aligned node groups (g1,g2). For example, a node g1 in the target DAG G1 is aligned with a node g2 in the reference DAG G2 after the first POA operation. The node g1 and the node g2 may be respectively a character-level DAG or a token including a plurality of characters. In order to find out the most proper presentation way for each aligned node group (g1,g2), in this embodiment, a next stage of processing is also required.

The second POA operation module 620 performs the second POA operation on one or more aligned node groups (g1,g2) provided by the first POA operation module 610. The second POA operation is to finally find out an optimal character alignment path from each aligned node group by using characters as an alignment unit.

When the second POA operation module 620 performs the second POA operation on an aligned node group (g1,g2), first, the second POA operation module 620 converts a first node g1 and a second node g2 aligned therewith into a first directed acyclic subgraph and a second directed acyclic subgraph with characters as node units; then, the second POA operation module 620 calculates an LCS value of each possible path pair of the first directed acyclic subgraph and the second directed acyclic subgraph; and finally, the second POA operation module 620 determines a path pair with the greatest LCS value as the optimal character alignment path (p1*,p2*) of the aligned node group. After obtaining the optimal character alignment path (p1*,p2*), the second POA operation module 620 transmits information of the optimal character alignment path (p1*,p2*) to the DAG merging module 630.

In this embodiment, a merging condition is defined:

$$NLCS(p1^*,p2^*) \geq \alpha \tag{7}$$

In order to make the final HDAG to effectively present similar features and different features of the overall data, a merging condition is deliberately set when the method for generating the HDAG is designed. In this embodiment, the defined merging condition is whether a similarity between two aligned nodes g1 and g2 meets a similarity threshold $\alpha$. If the difference between the two nodes is too large and the merging condition is not set according to the similarity, the HDAG presented after the merging will also lose its recognizability. The readability of a merging result can be ensured through the similarity check of each group of g1 and g2.

For example, the DAG merging module 630 may perform a merging condition analysis operation on each aligned node group by using the optimal character alignment path found from each aligned node group by the second POA operation module 620 to calculate a normalized common subsequence length of each aligned node group, and determine whether the normalized common subsequence length meets the merging condition. In practice, the DAG merging module 630 calculates an NLCS(p1*,p2*) of the optimal character alignment path (p1*,p2*) according to formula (6). If the NLCS(p1*,p2*) is greater than or equal to a similarity threshold $\alpha$, it is determined that the aligned node group (g1,g2) can be merged.

The DAG merging module 630 performs corresponding processing on each aligned node group of the target DAG G1 and the reference DAG G2 according to the result determined under the merging condition, and finally merges the target DAG G1 and the reference DAG G2 into a DAG Gout. For example, the DAG merging module 630 may merge aligned node groups that meet the merging condition in formula (7) into a common node to replace the original aligned node groups, and mark each aligned node group that does not meet the merging condition as an independent branch node. Finally, after all common nodes and branch nodes are recombined, the target DAG G1 and the reference DAG G2 are merged into the DAG Gout.

The DAG Gout outputted by the DAG merging module 630 may be fed back to the first POA operation module 610 to be a reference DAG G2 for a next HPOA operation. The DAG drawing module 640 may execute a drawing function and display a finally generated DAG Gout as an HDAG through the display device 141. In the process of generating the HDAG, the DAG drawing module 640 draws a DAG with tokens as node units, and further draws each node as a directed acyclic subgraph with characters as node units according to the optimal character alignment path in each node.

The data analysis module 153 shown in FIG. 6 includes the following advantages. Since most activities records include a main command word and a plurality of parameter words, if similar features and differential features are distinguished directly with sentences as a unit, a DAG that is extremely divergent and unreadable will be formed. The data analysis module 153 provides a two-stage merging operation. At the first stage, the target DAG G1 and the reference DAG G2 are first analyzed with tokens as a minimum node unit. At the second stage, nodes corresponding to each group are then analyzed respectively with characters as a minimum node unit. Since tokens are interpreted based on meaningful instruction units, the analysis result is closer to the needs of practical applications. In addition, if tokens that are excessively different are forcibly merged together, the finally outputted HDAG will also lose readability. Therefore, the data analysis module 153 further provides a merging condition analysis operation to ensure that the merged HDAG has more than a certain degree of similarity in the content of the common nodes.

In a further embodiment, the data analysis module 153 may also include a multi-iteration operation. For example, two HDAGs are merged in a more upper-rank manner with the directed acyclic subgraph as a minimum node unit to form a multi-level DAG that can be displayed according to the needs of different resolutions. According to another aspect, the similarity threshold $\alpha$ used in the merging condition analysis operation by the second POA operation module 620 may be adjusted in real time or flexibly customized, so that the HDAG generated by the DAG drawing module 640 presents similar features of a proper scale, so as to be close to the requirements of practical applications.

Figure 7:
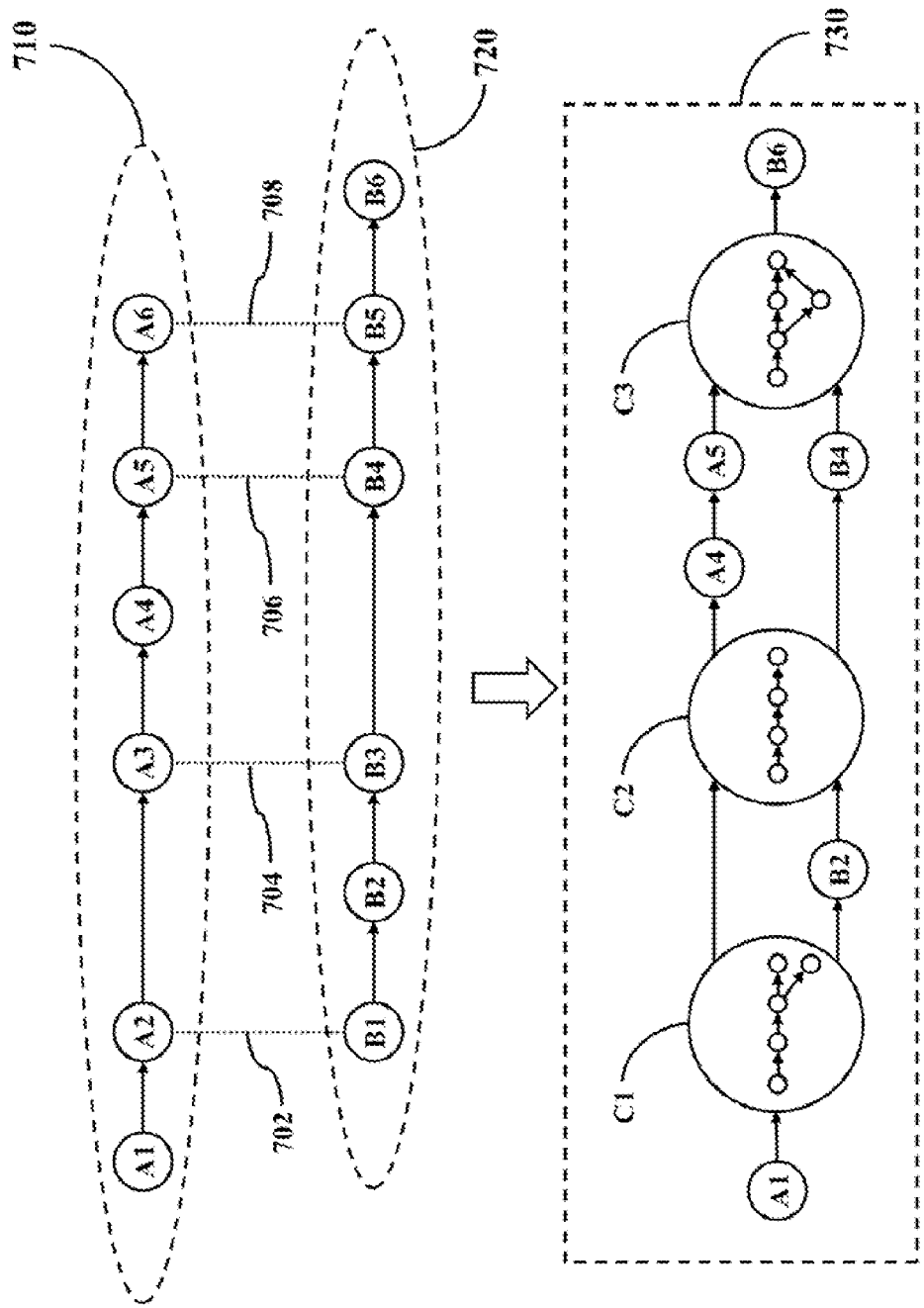
FIG. 7 shows an embodiment in which an HPOA operation of the present invention is performed to generate an HDAG from a target DAG and a reference DAG.

FIG. 7 shows an embodiment in which an HPOA operation of the present invention is performed to generate an HDAG 730 from a target DAG 710 and a reference DAG 720. In order to more easily understand the effect produced by the embodiment in FIG. 6, the following describes the process of merging the target DAG G1 and the reference DAG G2 into an HDAG 730 with reference to FIG. 7.

In FIG. 7, the target DAG 710 represents a first target DAG G1, and the reference DAG 720 represents a second reference DAG G2. The target DAG 710 is an activities record, and the activities record may be regarded as a DAG with only single chain including a plurality of first nodes A1 to A6 in FIG. 7. Each node corresponds to a token in an activities record. Similarly, the reference DAG 720 may also be regarded as a single-chain DAG including a plurality of second nodes B1 to B6. Through the first POA operation performed by the first POA operation module 610, an optimal alignment path of the target DAG 710 and the reference DAG 720 can be found out. In other words, a plurality of groups of alignment information 702, 704, 706, and 708 can be obtained, which record a plurality of aligned node groups respectively in the target DAG 710 and the reference DAG 720. Then, the second POA operation module 620 performs the second POA operation on each aligned node group according to the alignment information 702, 704, 706, and 708 respectively. The DAG merging module 630 further performs a merging condition analysis operation according to an operation result of the second POA operation module 620, to only merge the nodes with a similarity meets the condition, but not merge the nodes with an extremely low similarity. Then, the nodes that can be merged in the target DAG 710 and the reference DAG 720 are merged into a common node in the HDAG 730. The nodes that cannot be merged in the target DAG 710 and the reference DAG 720 are correspondingly used as branch nodes in the HDAG 730.

As shown in FIG. 7, it is determined by the second POA operation of the second POA operation module 620 and formula (7) that nodes A2 and B1 recorded by the alignment information 702 can be merged, so the character contents in the nodes A2 and B1 are merged into a character-level directed acyclic subgraph in a common node C1 in the HDAG 730. Similarly, it is determined by the second POA operation of the second POA operation module 620 and formula (7) that nodes A3 and B3 recorded by the alignment information 704 meet a merging condition, so the nodes A3 and B3 are finally merged into a common node C2 in the HDAG 730. If the nodes A3 and B3 in the target DAG 710 are exactly the same tokens, the common node C2 in the HDAG 730 presents a character-level directed acyclic subgraph formed by merging the node A3 or B3.

If it is determined by the second POA operation of the second POA operation module 620 and formula (7) that a first node A5 and a second node B4 recorded by the alignment information 706 do not meet the merging condition, the first node A5 and the second node B4 keep in an unmerged state in the HDAG 730. Other nodes that are not aligned in the first POA operation, such as a first node A1, a second node B2, a first node A4, and a second node B6, also keep in an unmerged state in the HDAG 730.

In summary, the HDAG 730 in FIG. 7 is formed through a two-stage POA operation performed by the target DAG 710 and the reference DAG 720 and a merging condition determination. During actual application, the first POA operation module 610, the second POA operation module 620, and the DAG merging module 630 need to perform a large number of iterative operations to gradually merge a large number of activities records. The HDAG 730 outputted by the DAG merging module 630 may be iterated back into the first POA operation module 610 and subjected to a merging operation with a next activities record, to gradually accumulate the amount of information carried in the HDAG 730. A final product of the DAG merging module 630 may be drawn by the DAG drawing module 640 as a visible graph, so as to facilitate subsequent analysis.

The embodiment in FIG. 7 may include the following advantages. The structure presented by the HDAG 730 may be summarized as common nodes representing similar features and branch nodes representing different features. Information security analysts can visually obtain intuitive and clear identification guidance, which is convenient for finding abnormalities.

In a further embodiment, the DAG drawing module 640 may present various node features with different sizes or colors, so as to more effectively highlight anomalies. For example, different colors or node sizes are assigned based on the frequency of occurrence of some nodes or the average similarity between directed acyclic subgraphs in common nodes. According to another aspect, the DAG drawing module 640 may also provide a scaling function, so that the HDAG 730 presents different details according to different resolution requirements.

Figure 8:
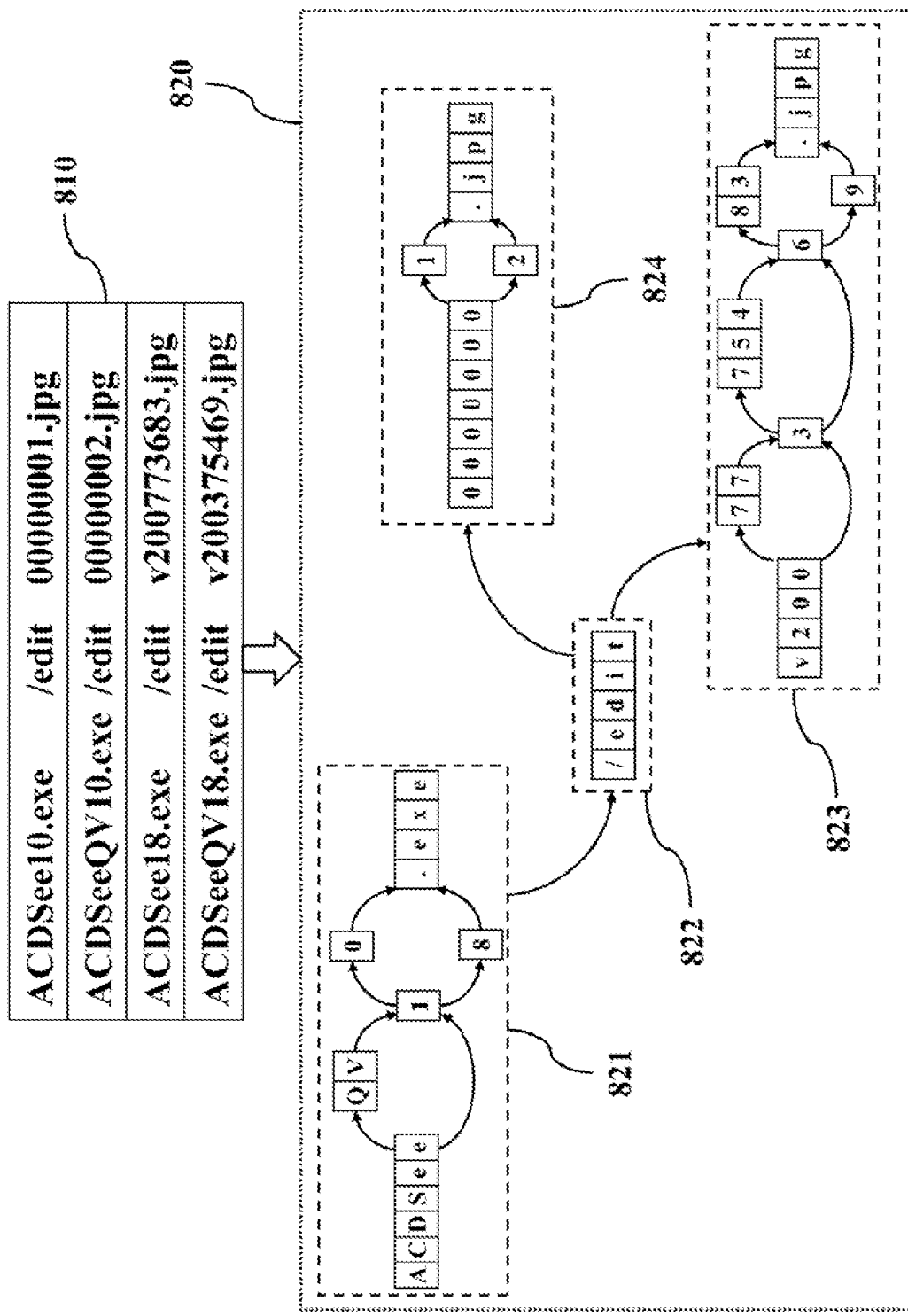
FIG. 8 shows an embodiment in which an HPOA operation of the present invention is performed to generate an HDAG from an event cluster.

FIG. 8 shows an embodiment in which an HPOA operation of the present invention is performed to generate an HDAG 820 from an event cluster 810. During actual application, the event cluster 810 includes a plurality of activities records, and the data analysis module 153 may convert the plurality of activities records in the event cluster 810 into the HDAG 820. The effect of the two-stage POA operation described in the embodiment in FIG. 6 can be more observed from nodes 821-824 in the HDAG 820.

For example, first tokens of all activities records in the event cluster 810 are different, but have the common feature of an executable file name related to "ACDSee*". The node 821 is formed through the operations from the first POA operation module 610 to the DAG merging module 630 and the drawing of the DAG drawing module 640. The node 821 includes a directed acyclic subgraph with characters as a minimum unit, so that the similarities and differences of the executable file name in the plurality of activities records of the event cluster 810 are clear at a glance.

For example, second tokens of all activities records in the event cluster 810 are the same "/edit". The node 822 is formed through the operations from the first POA operation module 610 to the DAG merging module 630 and the drawing of the DAG drawing module 640. The node 822 includes a single-chain directed acyclic subgraph formed by the single token "/edit".

For example, third tokens of all activities records in the event cluster 810 are different, but after the operations from the first POA operation module 610 to the DAG merging module 630, every two tokens that meet the merging condition in similarity may be merged. For example, in this embodiment, the similarity threshold a may be defined as 0.3, that is, two tokens can be merged when the NLCS calculated according to formula (7) is greater than or equal to 0.3. According to this principle, the DAG merging module 630 finally generates two branches of node 823 and node 824 from the event cluster 810. It is shown by the node 823 in FIG. 8 that the two tokens starting with "v200" meet the similarity condition, and thus form a directed acyclic subgraph presented with characters as node units. According to another aspect, the two tokens starting with "000" are also similar to each other, and form the node 824 including a directed acyclic subgraph through the processing of the DAG merging module 630 and the drawing of the DAG drawing module 640.

The embodiment in FIG. 8 may include the following advantages. The structure presented by the HDAG 820 may be summarized as common nodes representing similar features and branch nodes representing different features. Information security analysts can visually obtain intuitive and clear identification guidance, which is convenient for finding abnormalities. According to another aspect, since the nodes 821-824 are presented with tokens as a unit, if there is a newly added activities record that needs to be subjected to a merging operation with the HDAG 820, only tokens that meet the similarity condition will be merged into existing nodes, and nodes with excessively large differences will adaptively form a new branch. Therefore, during gradually expanding and growing, the HDAG 820 also has the function of feature classification, which makes it easier for analysts to find and determine abnormalities.

Figure 9:
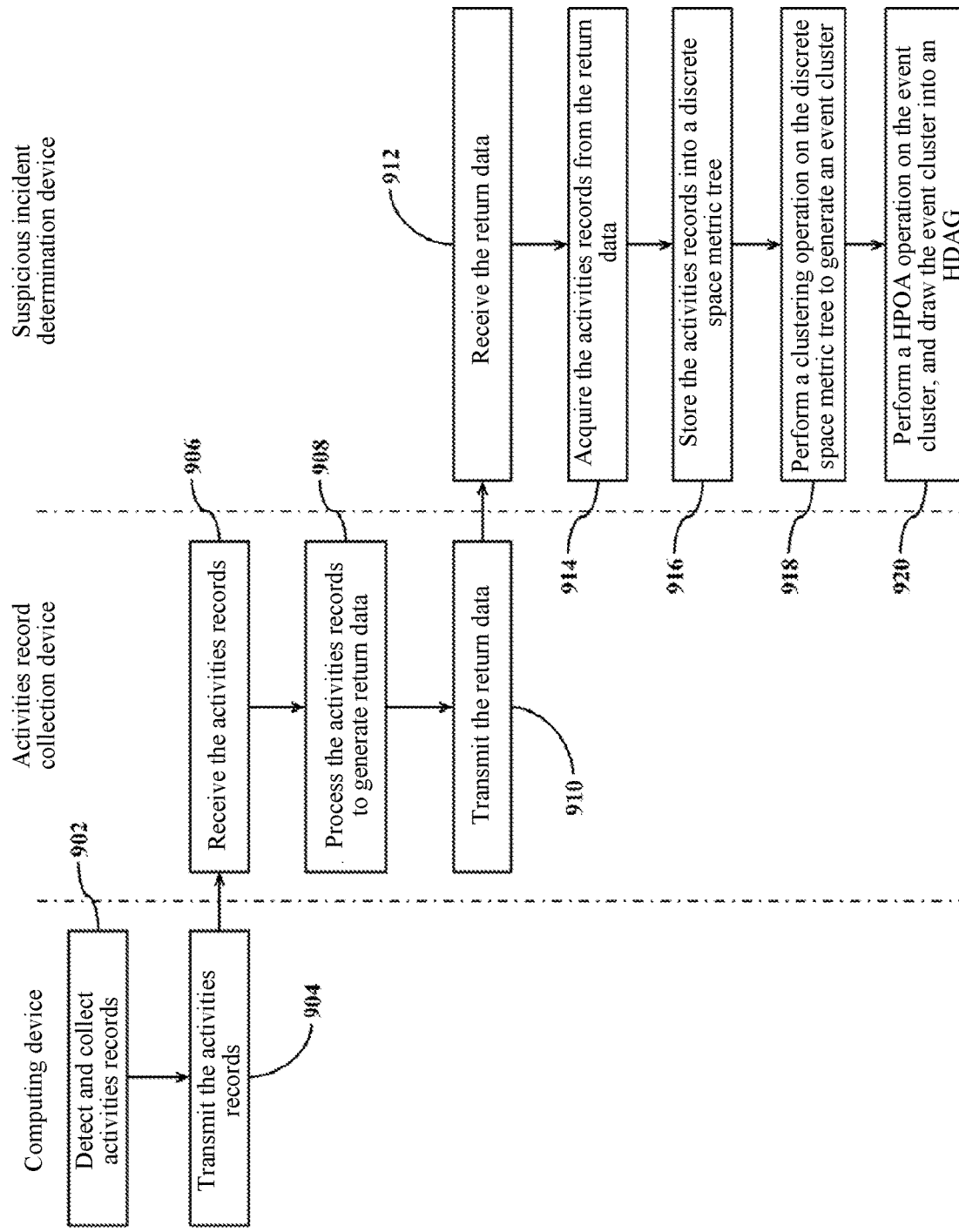
FIG. 9 is a flowchart of operation of an information security incident diagnosis system according to the present invention.

FIG. 9 is a flowchart of operation of an information security incident diagnosis system 100 according to the present invention.

In the flowchart of FIG. 9, a process in a field to which a specific device pertains represents a process performed by the specific device. For example, the part marked in the "computing device" field is a process performed by the computing devices 111-112 in the target network system 102; the part marked in the "activities record collection device" field is a process performed by the activities record collection device 130; and the part marked in the "suspicious incident determination device" field is a process performed by the suspicious incident determination device 140.

In the daily operation of the target network system 102, the computing device will execute the installed device activity reporting program 120 to perform processes 902-904 in FIG. 9. For ease of description, the computing device 111 is used as an example for description below.

In process 902, the computing device 111 detects and collects activities records. In process 904, the computing device 111 transmits the activities records to the activities record collection device 130.

The device activity reporting program 120 installed in the computing device 111 may read and record the content of specific non-volatile data in the computing device 111 using known or customized recording technologies in process 902, such as system logs, boot-up autorun items, execution records, and/or file meta data of specific types of files.

In an example, in a case that an operating system of the computing device 111 is Windows, the device activity reporting program 120 may read Windows event logs, autorun registries, schedule jobs, prefetch caches, Shimcache and/or Amcache, and/or file meta data of portable executable files (PE files) in .exe/.dll/.sys format that are stored in the computing device 111.

In another example, in a case that an operating system of the computing device 111 is Linux, the device activity reporting program 120 may read log items under the folder "/var/log/", system and service management tools (Systemd), SysV init scripts, schedule commands (crontab), system initialization programs (Upstart), dynamic web pages in .php/.jsp format, shell scripts, sensitive files, command histories, syslogs, and/or file meta data of executable and linkable format files (ELF files) in .so/.ko format that are in the computing device 111.

In another example, in a case that an operating system of the computing device 111 is macOS, the device activity reporting program 120 may read log items under the folder "/var/log/", records under the folder "/Library/LaunchAgents/", records under the folder "/Library/LaunchDaemons/", shell scripts, command histories, and/or file meta data of Mach object files (Mach-O files) that are in the computing device 111.

In addition to the above non-volatile data, the device activity reporting program 120 may also record the content of specific volatile data such as the memory content and/or network behavior of the computing device 111 in process 902. For example, the device activity reporting program 120 may query the status of the connection between the computing device 111 and the external network by using a network connection query command "netstat", and may also detect the IP address accessed by the computing device 111 and the operation status of the network ports of the computing device 111 by using various methods.

During operation, the device activity reporting program 120 may also perform preliminary analysis on the content of specific non-volatile data and/or volatile data associated with the computing device 111 by using various filtering and determining algorithms to screen some activities records that may be associated with hack intrusion activities out of a large number of activity histories in the computing device 111 as suspicious activities records, so as to reduce the amount of data that needs to be processed or analyzed by the activities record collection device 130 and the suspicious incident determination device 140.

During actual application, return activities records collected by the device activity reporting program 120 may include historical records associated with the computing device 111, such as multiple types of file execution activities, file creation activities, file editing activities, networking activities, keystroke logging activities, password stealing activities, credential dumping activities, code injection activities, code manipulation activities, and/or executable code accessing activities.

The types of the above activities records are only used to describe common types of information security threats, and are not intended to limit any possible types of computer activities records in practical applications.

In addition, when capturing activities records, the device activity reporting program 120 may also add some auxiliary information in the activities records, such as a time stamp, relevant file path information, or online login personnel information.

In practice, during the operation of the computing device 111, the device activity reporting program 120 may perform the operation of process 902 in real time, or may perform the operation of process 902 intermittently or periodically.

In process 904, the device activity reporting program 120 may transmit suspicious activities records associated with the computing device 111, and corresponding time stamps and property labels to the activities record collection device 130 by proper data transmission methods. The device activity reporting program 120 in the other computing device 112 may also perform the operations of processes 902-904 independently according to the above methods. In addition, a plurality of device activity reporting programs 120 in the computing devices 111-112 may perform the operations of processes 902-904 simultaneously at the same predetermined time period, or may perform the operations of processes 902-904 separately at different time periods.

In process 906, the communication circuit 131 of the activities record collection device 130 will receive, through proper network connection (for example, the intranet or Internet of the target network system 102), the activities records transmitted by a plurality of computing devices 111-112 in the target network system 102.

In process 908, the processing circuit 133 of the activities record collection device 130 will process a plurality of suspicious activities records received to generate return data. For example, the processing circuit 133 may perform data encapsulation, compression, encryption, electronic signatures, segmentation, and other processing on the activities records received to generate the return data in a proper format.

In process 910, the processing circuit 133 will transmit the return data to the suspicious incident determination device 140 by using the communication circuit 131 through a proper network (for example, the Internet).

In process 912, the communication circuit 143 of the suspicious incident determination device 140 will receive, through a proper network (for example, the Internet), the return data generated by the activities record collection device 130.

In process 914, the control circuit 149 of the suspicious incident determination device 140 will process the return data received to acquire the activities records associated with the target network system 102 from the return data. For example, the control circuit 149 may perform combination, decompression, decryption, electronic signature verification, and other processing on the return data to capture the above activities records from the return data.

In process 916, the control circuit 149 will execute the data analysis module 153 in the information security analysis program 150 in the storage circuit 147 to convert the activities records into a discrete space metric tree for storage. According to the embodiments of FIG. 2 to FIG. 5, the discrete space metric tree established by the data analysis module 153 is improved from a conventional BK-tree, each node stores an activities record, and a weighting coefficient on each edge is represented by an improved HED. This facilitates the processing of a large amount of data and accelerates subsequent operations.

In process 918, the control circuit 149 will execute the data analysis module 153 in the information security analysis program 150 in the storage circuit 147 to perform a clustering operation on the discrete space metric tree to generate an event cluster. According to the embodiment of FIG. 5, the clustering operation is to form a plurality of cluster categories adaptively from a large amount of activities records under the conditions defined by formulas (4) and (5) based on the discrete space metric tree. The detailed operation processes of the data analysis module 153 will be introduced in FIG. 10.

In process 920, the control circuit 149 will execute the graph generating module 155 in the information security analysis program 150 in the storage circuit 147 to perform a graph generating operation on each event cluster to draw each event cluster into an HDAG. According to the embodiments of FIG. 6 to FIG. 8, the graph generating module 155 may effectively convert a large amount of activities records into a visual graph that can present similar features and different features clearly at a glance, as an effective tool for assisting information security analysts. The detailed operation processes of the graph generating module 155 will be introduced in FIG. 11.

Figure 10:
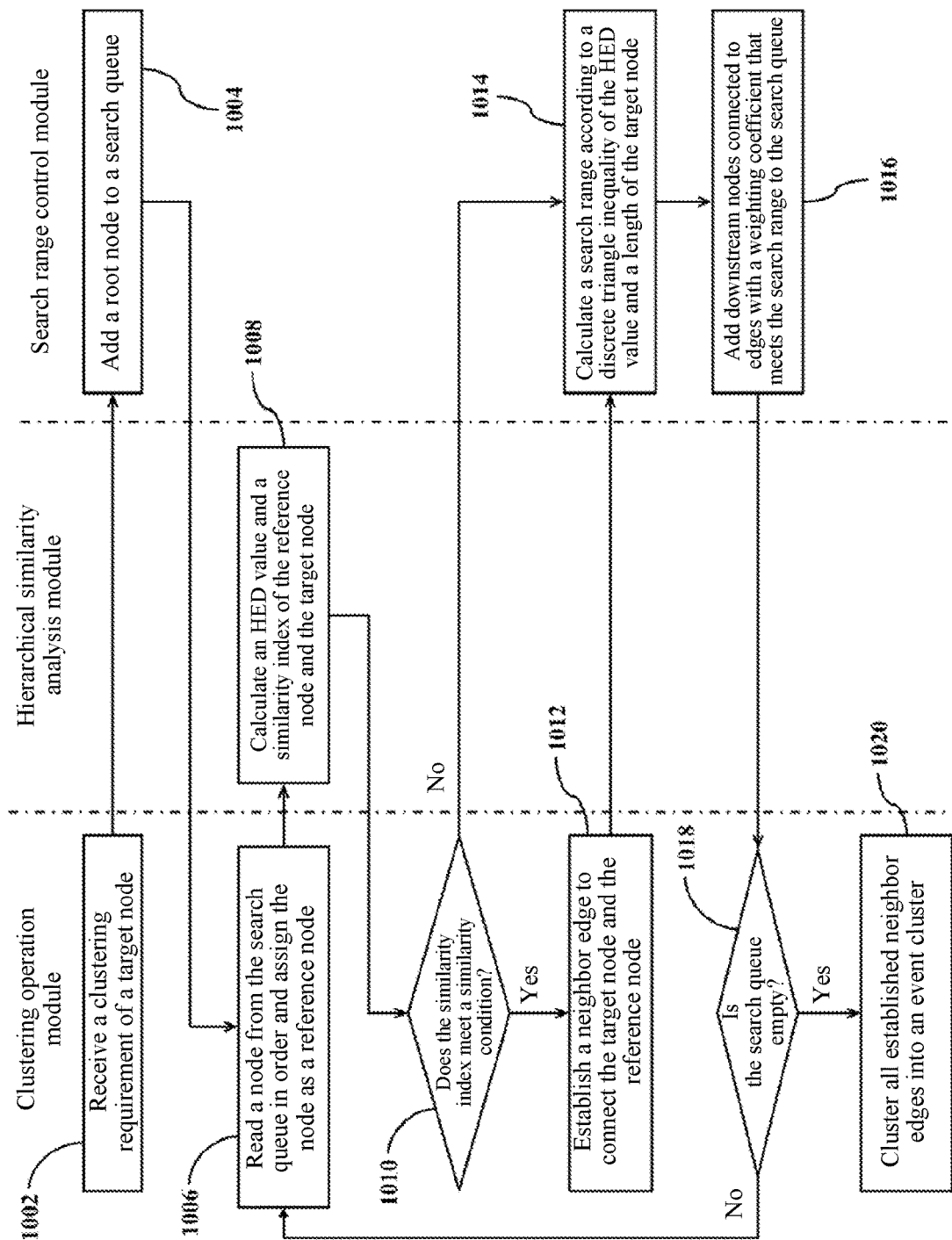
FIG. 10 is a flowchart of operation of an event analysis program according to the present invention.

The detailed processes of performing a clustering operation by the data analysis module 153 are described in FIG. 10 with reference to the embodiments of FIG. 3 to FIG. 5.

FIG. 10 is a flowchart of operation of the data analysis module 153 according to the present invention.

In the flowchart of FIG. 10, a process in a field to which a specific device pertains represents a process performed by the specific device. For example, the part marked in the "clustering operation module" field is a process performed by the clustering operation module 210 in the data analysis module 153; the part marked in the "hierarchical similarity analysis module" field is a process performed by the similarity analysis module 230 in the data analysis module 153; and the part marked in the "search control module" field is a process performed by the search control module 220 in the data analysis module 153.

In process 1002, in the suspicious incident determination device 140, the control circuit 149 executes the data analysis module 153 to activate a clustering operation. The data analysis module 153 regards a newly added activities record as a target node and requires the clustering operation module 210 to activate a clustering operation mainly based on the target node. The clustering operation module 210 then activates the clustering operation.

In process 1004, the search control module 220 adds a root node to a search queue. As described in the embodiments of FIG. 3 to FIG. 5, the essence of the clustering operation is to perform a large number of search and conditional determination operations based on the discrete space metric tree. The main functions of the search control module 220 include determining and managing objects to be searched in the discrete space metric tree and using the search queue as the basis for recursive operations.

In process 1006, the clustering operation module 210 reads a node from the search queue in order and assigns the node as a reference node. According to process 1004, a first node in the search queue is the root node. In other words, the clustering operation is a search process starting from the root node.

In process 1008, the search control module 220 calculates an HED value and an HLCS length of the reference node and a target node. After acquiring a reference node in the process, the clustering operation module 210 requires the search control module 220 to perform an operation of the HED and the HLCS length by using the target node and the reference node as two input parameters. As described in the embodiment of FIG. 4, the HED represents a sentence-level optimal replacement cost value obtained through accumulation based on an improved NED. The HED and the HLCS length have the dual property described in formula (3), and may be respectively applied in different subsequent operations. For example, in this embodiment, the HLCS length between two nodes is referred to as a similarity index of the two nodes.

In process 1010, the clustering operation module 210 determines whether the similarity index meets a similarity condition. The similarity condition is defined by formula (5) in the embodiment of FIG. 5 as follows:

$$HLCS(S, S') \geq \frac{1}{2}\max\{|S|, |S'|\} \tag{5}$$

If the target node and the reference node meet formula (5), process 1012 is performed. Otherwise, process 1014 is performed.

In process 1012, the clustering operation module 210 establishes a neighbor edge to connect the target node and the reference node. In this embodiment, the neighbor edge is a term used for description in a two-dimensional space. In an implementation of the data structure, the neighbor edge may be a set of vectors or arrays recording addresses or numbers of nodes at both ends and a similarity index, i.e., an HLCS length, of the nodes at the both ends.

In process 1014, the search control module 220 determines a next node to be searched based on all downstream edges of the reference node. As described in the embodiment of FIG. 5 and the discrete triangle inequality in formula (4), the search control module 220 calculates a search range according to the HED between the reference node and the target node, and an expected similarity value E.

In process 1016, the search control module 220 adds downstream nodes connected to edges with a weighting coefficient that meets the search range in all downstream edges of the reference node to the search queue according to the search range calculated.

In process 1018, the clustering operation module 210 determines whether the search queue is empty. If the search queue is empty, indicating that the search ends, process 1020 is performed. If the search queue is not empty, return to process 1006 to perform next search and determination.

In process 1020, all neighbor edges established in process 1012 are clustered into an event cluster. In this embodiment, the event cluster is expressed in a slightly different way from the discrete space metric tree. The discrete space metric tree is an improved data structure used to organize a large number of activities records, in which nodes are connected to each other by "edges" to facilitate search, update, and classification. The event cluster is a "neighbor edge" set established for a plurality of activities records with high similarity. Finally, the clustering operation module 210 outputs a set composed of all neighbor edges to represent the event cluster found with the target node as the center.

In a further embodiment, in the clustering operation, no objects similar to the target node may be found in the discrete space metric tree, so that the target node becomes a new cluster of a single node. Further, the discrete space metric tree may be further improved, for example, the cluster to which each node pertains is recorded in the node. When a new node is added into the discrete space metric tree and nodes that can establish neighbor edges are found, the cluster to which the node pertains is directly added, and thus the subsequent search process is omitted. Still further, before the cluster operation is performed, the range of the expected similarity value ε may be pre-adjusted, so as to adjust the concentration of the event cluster. In an embodiment, the expected similarity value ε may be set as a length of the target node, that is, a number of characters included in the activities records in the target node.

Figure 11:
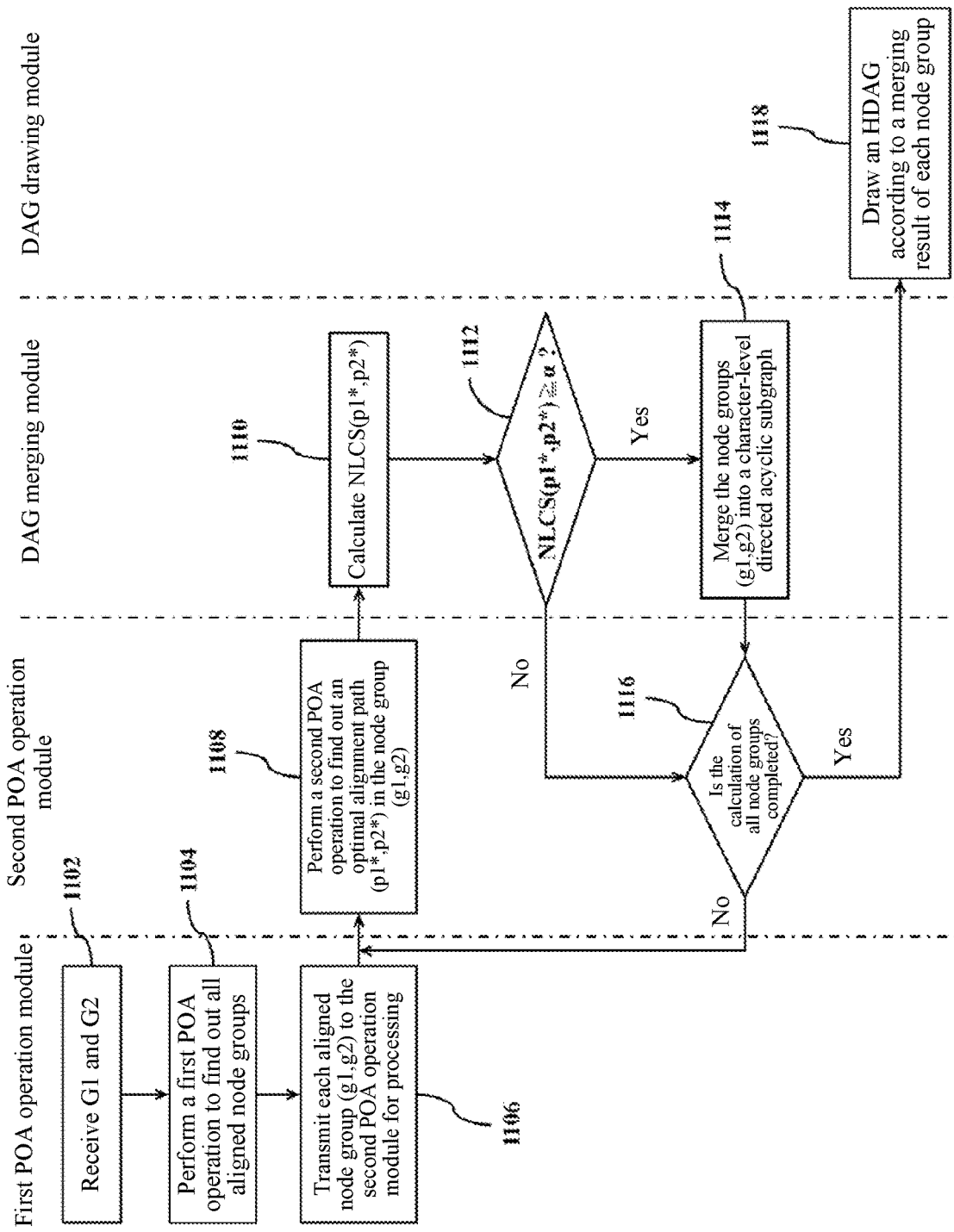
FIG. 11 is a flowchart of operation of a graph generating module according to the present invention.

The following describes a process of generating an HDAG with reference to FIG. 11.

FIG. 11 is a flowchart of operation of the graph generating module 155 according to the present invention. In the flowchart of FIG. 11, a process in a field to which a specific device pertains represents a process performed by the specific device. For example, the part marked in the "first POA operation module" field is a process performed by the first POA operation module 610 in the graph generating module 155; the part marked in the "second POA operation module" field is a process performed by the second POA operation module 620 in the graph generating module 155; the part marked in the "DAG merging module" field is a process performed by the DAG merging module 630 in the graph generating module 155; and the part marked in the "DAG drawing module" field is a process performed by the DAG drawing module 640 in the graph generating module 155.

As described in the embodiment of FIG. 6, the graph generating module 155 iteratively substitutes a large number of activities records into the first POA operation module 610, the second POA operation module 620, and the DAG merging module 630, and finally may draw a merged HDAG through the DAG drawing module 640. In this embodiment, the first POA operation and the second POA operation may also be collectively referred to as an HPOA operation. Two DAGs of target DAG G1 and reference DAG G2 are used as an example for description below.

In process 1102, the first POA operation module 610 receives two input values of target DAG G1 and reference DAG G2.

In process 1104, the first POA operation module 610 performs the first POA operation on the DAGs G1 and G2 by using an NLCS replacement score algorithm to find out information of nodes aligned in the target DAG G1 and the reference DAG G2, including one or more aligned node groups (g1,g2). The first POA operation is performed with tokens as an alignment unit.

In process 1106, each aligned node group (g1,g2) is transmitted to the second POA operation module 620 for processing.

In process 1108, the second POA operation module 620 performs character-level POA on the aligned node group (g1,g2) with a conventional LCS algorithm as a replacement score to find out an optimal alignment path (p1*,p2*) of the aligned node group (g1,g2).

In process 1110, the DAG merging module 630 calculates an NLCS(p1*,p2*) of the optimal alignment path (p1*,p2*) according to the embodiment and formula (6) in FIG. 6.

In process 1112, the DAG merging module 630 determines whether the NLCS(p1*,p2*) is greater than or equal to a similarity threshold α. If the NLCS(p1*,p2*) is greater than or equal to the similarity threshold α, process 1114 is performed. Otherwise, process 1116 is performed.

In process 1114, the DAG merging module 630 merges the aligned node groups (g1,g2) into a character-level directed acyclic subgraph. Further, the DAG merging module 630 replaces the aligned node group (g1,g2) with a common node, and arranges to present the character-level directed acyclic subgraph obtained by merging the node groups (g1,g2) in the common node.

In process 1116, the second POA operation module 620 determines whether the calculation of all aligned node groups (g1,g2) transmitted by the first POA operation module 610 is completed. If the calculation is completed, process 1118 is performed. Otherwise, process 1108 is performed.

In process 1118, the DAG drawing module 640 draws an HDAG on the display device 141 according to a merging determination result of each aligned node group by the DAG merging module 630.

It needs to be understood that the process in FIG. 11 is only to simplify the generation principle of the HDAG for easy understanding. In an actual operation, the arrangement of operations is not limited to the cooperative manner or the operation order described by the first POA operation module 610, the second POA operation module 620, the DAG merging module 630, and the DAG drawing module 640.

The embodiments of FIG. 2 to FIG. 5 describe the process of establishing a plurality of suspicious activity clusters by the data analysis module 153. The embodiments of FIG. 6 to FIG. 8 describe the process of generating an HDAG by the graph generating module 155. The embodiment of FIG. 12 further describes how the suspicious incident determination device (140) converts a suspicious activity cluster into an HDAG.

Figure 12:
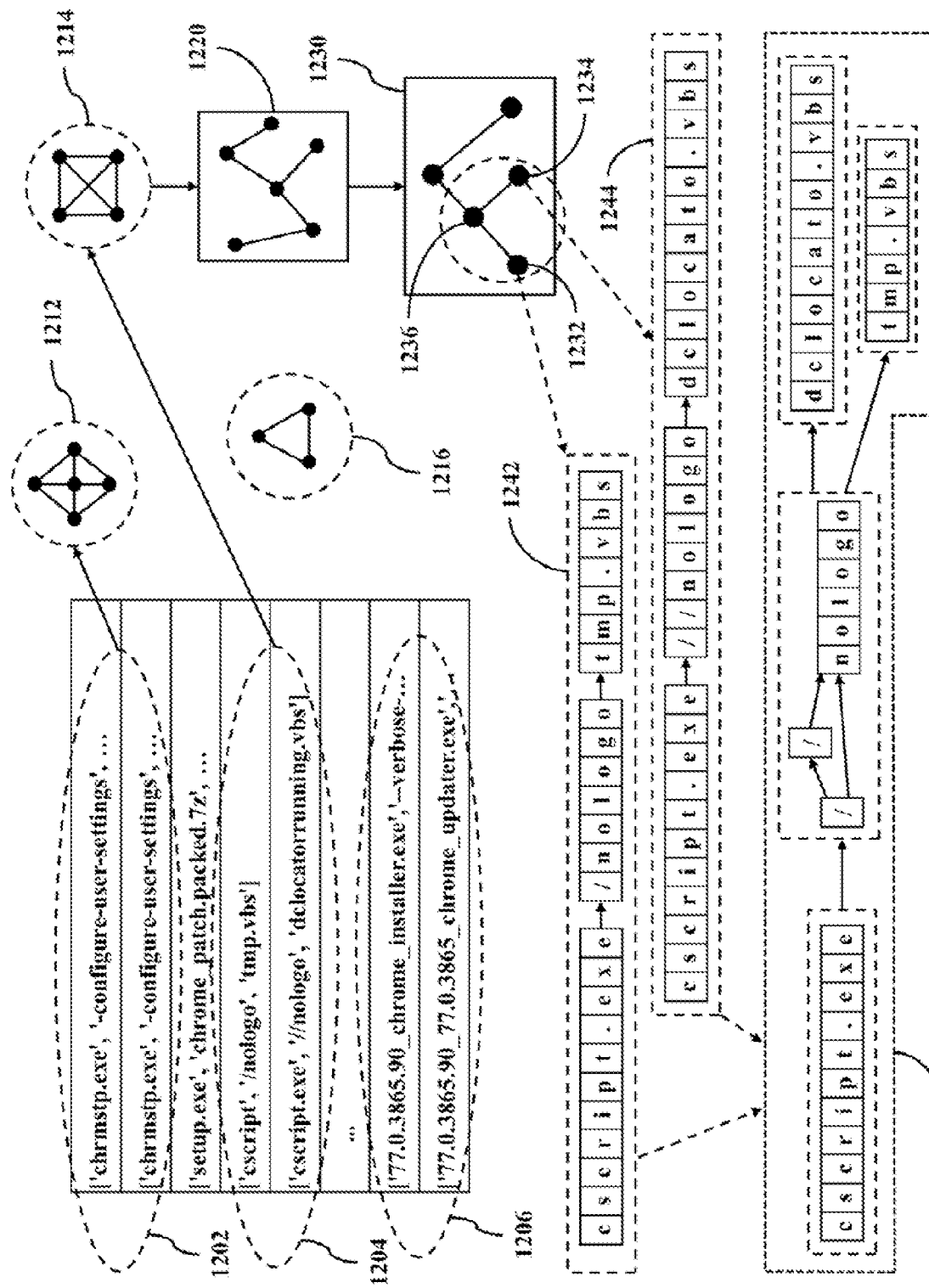
FIG. 12 shows an embodiment in which an information security incident diagnosis system of the present invention performs a multi-stage process to generate an HDAG.

FIG. 12 shows an embodiment in which the information security incident diagnosis system 100 of the present invention performs a multi-stage process to generate an HDAG 1250.

Various activities records received by the suspicious incident determination device 140 from the target network system 102 may be represented as a command line 1202, a command line 1204, and a command line 1206 in FIG. 12. Through the clustering operation in the embodiment of the data analysis module 153, activities records with high similarity will gradually accumulate into a plurality of different event clusters, such as an event cluster 1212, an event cluster 1214, and an event cluster 1216 in FIG. 12. The event cluster 1214 is used as an example. In order to generate the HDAG 1250 from the event cluster 1214, the information security analysis program 150 may perform single linkage clustering analysis on the event cluster 1214 by using the control circuit 149 to establish a guide tree as an order for substituting each node in the event cluster 1214 into the graph generating module 155.

For example, since the event cluster 1214 in this embodiment is an improved structure based on the discrete space metric tree, a minimum spanning tree algorithm may be run first to generate a minimum spanning tree 1220 according to the event cluster 1214. The minimum spanning tree 1220 retains all nodes in the event cluster 1214, but leaves only edges with the smallest weighting coefficient.

The information security analysis program 150 then performs single linkage clustering analysis on every two branches in the minimum spanning tree 1220 by using the control circuit 149 to establish a guide tree 1230 from the bottom of the minimum spanning tree 1220.

The single linkage clustering analysis is one of hierarchical agglomerative algorithms. In the conventional hierarchical agglomerative algorithms, data is agglomerated layer by layer starting from the bottom of a tree structure. Each piece of data may be regarded as a cluster. Assuming that there are n pieces of data, the n pieces of data are regarded as n clusters, that is, each cluster includes one piece of data. There are generally the following steps: 1. Regard each piece of data as a cluster Ci. 2. Find out two clusters with the closest distance from all clusters. 3. Merge the two clusters with the closest distance into a new cluster. 4. If there is more than one cluster existing, repeat step 2. In the conventional single-linkage agglomerative algorithms, the "two clusters with the closest distance" may be defined as the ED between the two closest nodes in different clusters. In the embodiments of this application, the "two clusters with the closest distance" may be defined as the two clusters with a pair of nodes with the largest HLCS length in different clusters.

In other words, in this embodiment, the cluster distance in the single linkage clustering analysis is defined as follows:

$$\max_{x \in X, y \in Y} \frac{1}{2}(|x| + |y| - HED(x, y)) \quad (8)$$

X and Y represent two clusters, and x and y are nodes in the two clusters. Formula (8) is derived from the embodiment of FIG. 3 and formula (3), and is used to find out a pair of nodes with the largest HLCS length from two clusters and define the HLCS length as an HLCS length of the two clusters X and Y. In other words, the process of generating the minimum spanning tree 1220 by the event cluster 1214 and the process of generating the guide tree 1230 through the single linkage clustering analysis may refer to the known literature, but in the present invention, the cluster distance in the single linkage clustering analysis is replaced with formula (8), so that the improvement effect of the discrete space metric tree can be extended to the process of generating the HDAG.

In FIG. 12, the structural principle of the guide tree 1230 is roughly as follows: each node in the minimum spanning tree 1220 is recombined from an end node according to the HLCS length in descending order. In other words, the guide tree 1230 may represent a similarity arranging order of all nodes in the event cluster 1214. The graph generating module 155 performs the graph generating operation to recursively traverse the guide tree 1230 upward from the end node and merge every two activities records in the event cluster 1214 in the order of high to low similarity.

For example, when performing the graph generating operation, the graph generating module 155 reads nodes upward from the end of the guide tree 1230, and then executes the first POA operation module 610, the second POA operation module 620, and the DAG merging module 630 to merge the nodes. A guide node 1232 in the guide tree 1230 corresponds to a target DAG 1242, and a guide node 1234 in the guide tree 1230 corresponds to a reference DAG 1244. Therefore, the graph generating module 155 performs the HPOA operation in FIG. 6 to merge the target DAG 1242 and the reference DAG 1244 into an HDAG 1250. Then, the graph generating module 155 may perform the HPOA operation on the HDAG 1250 and a guide node 1236 according to the order provided by the guide tree 1230. In this way, the node information in the event cluster 1214 is gradually merged into the HDAG 1250.

Figure 13:
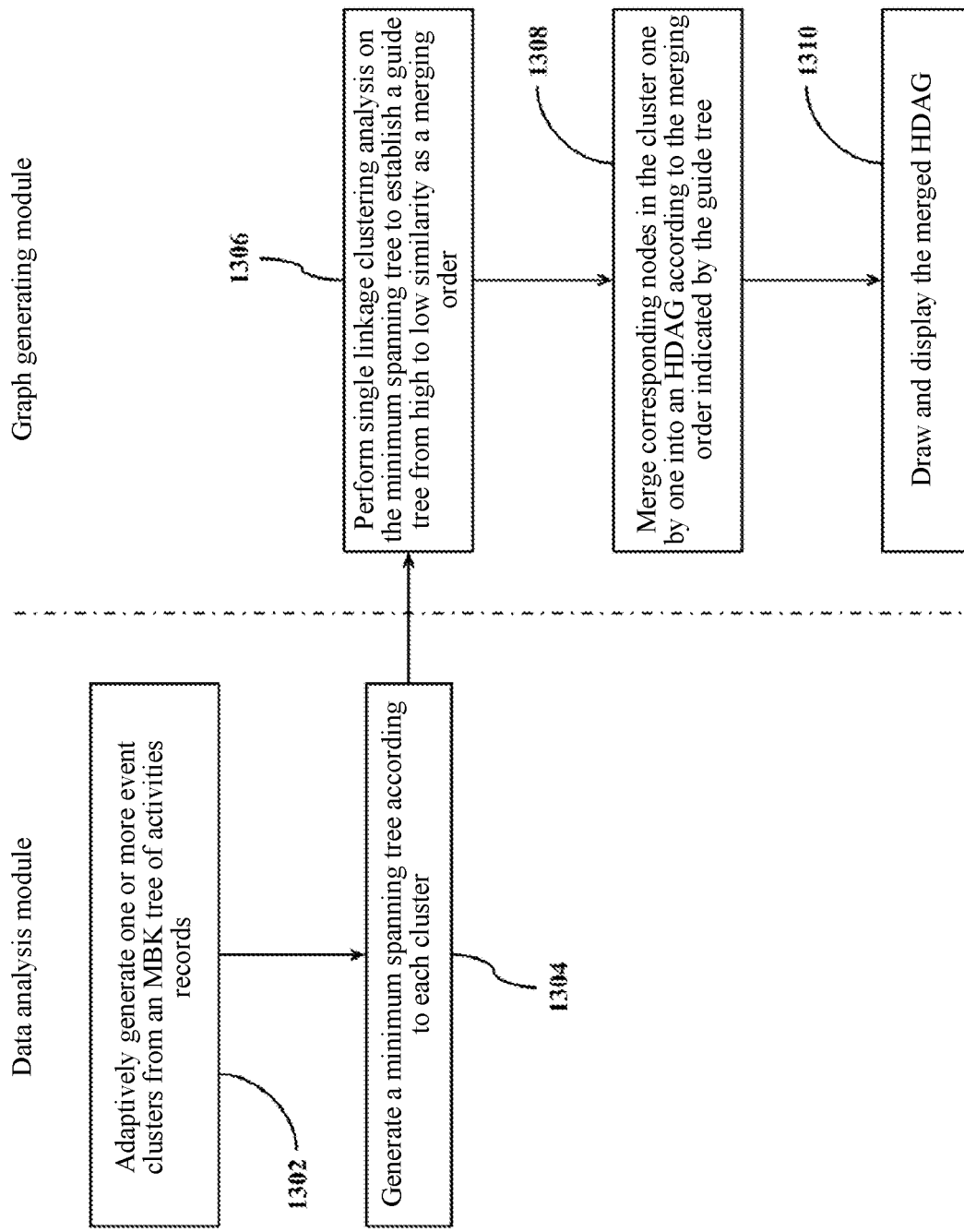
FIG. 13 is a flowchart of cooperative operation of a data analysis module and a graph generating module according to the present invention.

The following summarizes the cooperative operation of the data analysis module 153 and the graph generating module 155 in the information security analysis program 150 in practice with reference to FIG. 13.

FIG. 13 is a flowchart of cooperative operation of the data analysis module 153 and the graph generating module 155 according to the present invention.

In the flowchart of FIG. 13, a process in a field to which a specific device pertains represents a process performed by the specific device. For example, the part marked in the "event analysis program" field is a process performed by the data analysis module 153; the part marked in the "activities record collection device" field is a process performed by the activities record collection device 130; and the part marked in the "graph generating module" field is a process performed by the graph generating module 155.

In process 1302, the data analysis module 153 adaptively generates one or more event clusters from the discrete space metric tree of the activities records by using the control circuit 149.

In process 1304, the information security analysis program 150 generates a minimum spanning tree according to each event cluster. In an embodiment, an event cluster corresponds to a minimum spanning tree. The following uses a single minimum spanning tree as an example for description.

In process 1306, the information security analysis program 150 may perform single linkage clustering analysis on a minimum spanning tree by using the control circuit 149 to establish a guide tree from high to low similarity as a merging order.

In process 1308, the graph generating module 155 merges corresponding nodes in the cluster one by one into an HDAG according to the merging order indicated by the guide tree by using the control circuit 149. The suspicious incident determination device 140 may perform a graph generating operation on a plurality of activities records corresponding to the one or more event clusters in a recursive manner according to the merging order to generate an HDAG.

In process 1310, the graph generating module 155 displays the generated HDAG through the display device 141.

Figure 14:
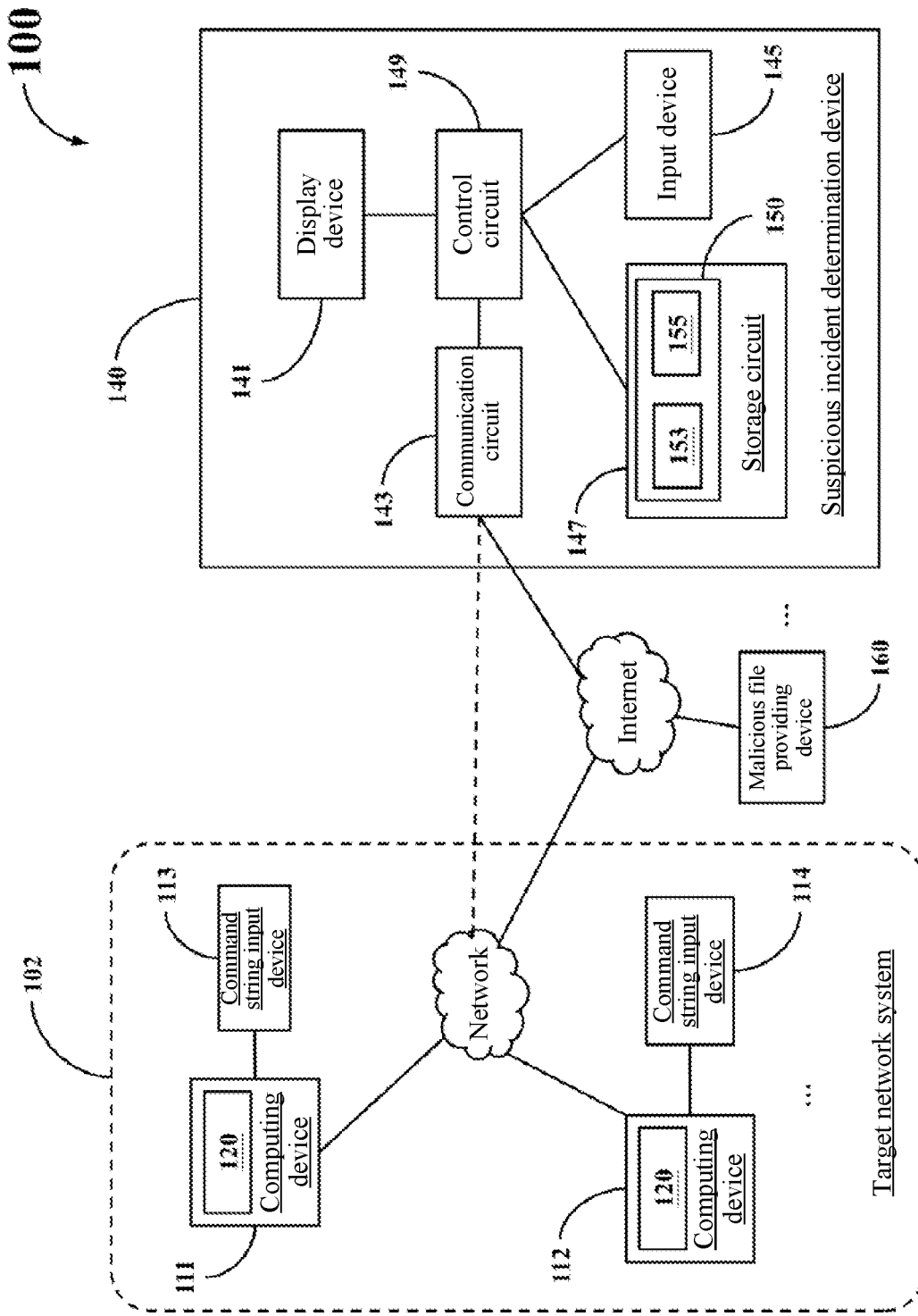
FIG. 14 is a simplified functional block diagram of an information security incident diagnosis system according to another embodiment of the present invention.

FIG. 14 is an architecture diagram of the information security incident diagnosis system 100 according to another embodiment of the present invention.

In an application environment where the quantity of the computing devices in the target network system 102 is small or the external network bandwidth of the target network system 102 is very sufficient, the activities record collection device 130 in the information security incident diagnosis system 100 may be omitted.

For example, FIG. 14 is a simplified functional block diagram of the information security incident diagnosis system 100 according to another embodiment of the present invention. In the embodiment of FIG. 14, the activities record collection device 130 in the architecture in FIG. 1 is omitted, and the operations of processes 906-908, which were originally performed by the activities record collection device 130, may be performed by an individual device activity reporting program 120. In other words, in the information security incident diagnosis system 100 in FIG. 13, the device activity reporting program 120 installed in an individual computing device will process a plurality of suspicious activities records to generate return data, and transmit the return data to the suspicious incident determination device 140 through a proper network (for example, the Internet).

The foregoing descriptions about the connection relationship, implementation, operation, and related advantages of other elements in FIG. 1 are also applicable to the embodiment of FIG. 14. For brevity, the description is not repeated herein.

Based on the above, the computer program product provided in the present invention may be roughly divided into the data analysis module 153 and the graph generating module 155. However, in a further embodiment, the data analysis module 153 and the graph generating module 155 do not necessarily need to be executed in the same suspicious incident determination device 140. In a broader distributed system architecture, the clustering operation module 210, the search control module 220, and the hierarchical similarity analysis module 230 in the data analysis module 153 do not necessarily need to be executed in the same suspicious incident determination device 140. An embodiment of cooperative operation of a log classification device 1510 and an event visualization device 1520 in an information security incident diagnosis system 1500 is described as follows with reference to FIG. 15.

Figure 15:
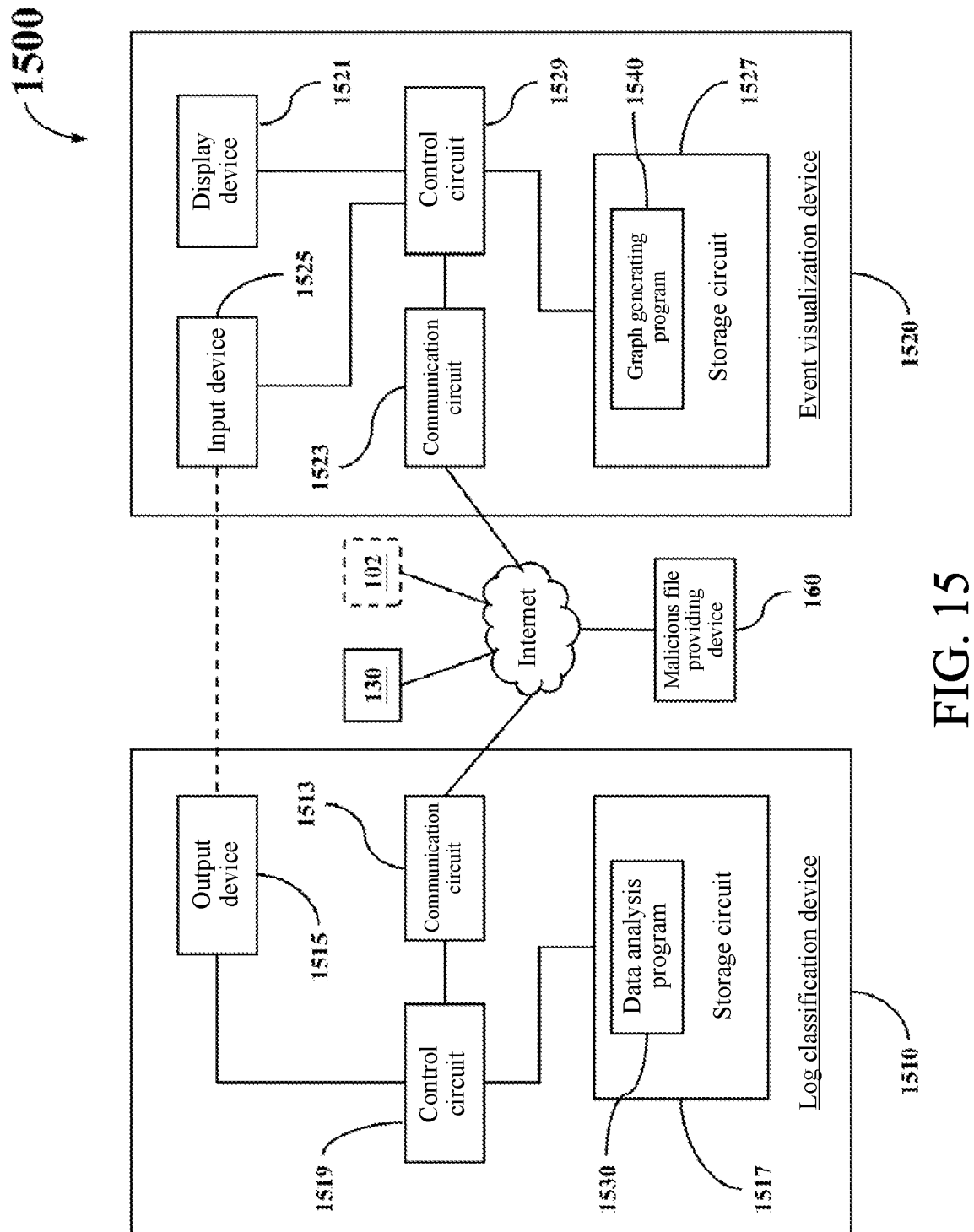
FIG. 15 is a simplified functional block diagram of an information security incident diagnosis system according to a further embodiment of the present invention.

FIG. 15 is a simplified functional block diagram of the information security incident diagnosis system 1500 according to a further embodiment of the present invention.

A target network system 102, an activities record collection device 130, and a malicious file providing device 160 in the information security incident diagnosis system 1500 are similar to the embodiment of FIG. 1, so the specific functions thereof are not described herein again. In FIG. 1, the suspicious incident determination device 140 may execute the data analysis module 153 and the graph generating module 155 stored in the storage circuit 147 by using the control circuit 149 to implement the analysis and diagnosis of an information security incident. Correspondingly, in the information security incident diagnosis system 1500, the suspicious incident determination device 140 is replaced with a log classification device 1510 and an event visualization device 1520. The log classification device 1510 may execute a data analysis program 1530 to implement the process shown in FIG. 10. The event visualization device 1520 may execute a graph generating program 1540 to implement the process shown in FIG. 11. The log classification device 1510 and the event visualization device 1520 may cooperatively perform the process shown in FIG. 13 to achieve the function of the suspicious incident determination device 140.

In FIG. 15, the log classification device 1510 includes a communication circuit 1513, an output device 1515, a storage circuit 1517, and a control circuit 1519, and may adaptively cluster a plurality of activities records collected from a target network system 102. The log classification device 1510 may collect the activities records from the activities record collection device 130 or the target network system 102 through the Internet by using the communication circuit 1513. Similar to the storage circuit 147 in FIG. 1, the storage circuit 1517 is configured to store a data analysis program 1530. The control circuit 1519 is coupled to the communication circuit 1513 and the storage circuit 1517, and is configured to execute the data analysis program 1530 to implement an adaptive data classification operation to generate auxiliary information for diagnosing whether there are intrusions or abnormalities in a target network system. For example, the data analysis program 1530 may generate a discrete space metric tree according to the plurality of activities records, and perform a clustering operation on the discrete space metric tree to generate one or more event clusters associated with one or more suspicious event categories.

The output device 1515 is configured to output the one or more event clusters and allow the information security incident diagnosis system 1500 to calculate similar feature information and differential feature information of a plurality of activities records in the one or more event clusters as auxiliary information for diagnosing whether there are intrusions or abnormalities in the target network system 102. In practice, the output device 1515 of the log classification device 1510 may be connected to an input device 1525 of the event visualization device 1520, so that the operation processes of the log classification device 1510 and the event visualization device 1520 are seamlessly connected. The connection between the output device 1515 and the input device 1525 may be based on the Serial Peripheral Interface (SPI), the Inter-Integrated Circuit (I2C), the Universal Serial Bus (USB), the Peripheral Component Interconnect (PCI), or published industry standards to ensure compatibility and performance. However, the communication channel between the log classification device 1510 and the event visualization device 1520 is not limited thereto. The log classification device 1510 and the event visualization device 1520 may alternatively be directly in communication with each other through the communication circuit 1513 and a communication circuit 1523. For example, the log classification device 1510 may provide a network access service through the communication circuit 1513 to allow the event visualization device 1520 to acquire a plurality of activities records of each event cluster based on the Structured Query Language (SQL), the Hypertext Transfer Protocol (HTTP), or other public transport protocols. Alternatively, the event visualization device 1520 may provide a network access service through the communication circuit 1523 to receive the event cluster and the activities record outputted by the log classification device 1510 after executing the data analysis program 1530.

In the information security incident diagnosis system 1500 in this embodiment, the data analysis program 1530 is a computer program product stored in the storage circuit 1517, allowing the log classification device 1510 to implement an adaptive data classification operation to generate auxiliary information for diagnosing whether there are intrusions or abnormalities in the target network system 102. It may be understood that the computer program product is not limited to be stored in the storage circuit 1517, but may be stored in the cloud and downloaded to the storage circuit 1517 as required.

The detailed operation of the data analysis program 1530 is similar to the data analysis module 153 in FIG. 1, referring to the embodiments in FIG. 3, FIG. 4, FIG. 5, and FIG. 10. When implementing the adaptive data classification operation, the log classification device 1510 may collect a plurality of activities records from the activities record collection device 130 or the target network system 102 through a network by using the communication circuit 1513. Similar to FIG. 1, these activities records are generated by a plurality of device activity reporting programs 120 according to command lines received by a plurality of computing devices 111-112. After executing the data analysis program 1530, the control circuit 1519 will generate a discrete space metric tree 500 shown in FIG. 5 according to the plurality of activities records, and perform a clustering operation on the discrete space metric tree 500 to generate one or more event clusters corresponding to one or more suspicious event categories. These event clusters may be outputted to the event visualization device 1520 through the communication circuit 1513 or the output device 1515 for subsequent processing, as auxiliary information for diagnosing whether there are intrusions or abnormalities in the target network system by the information security incident diagnosis system 1500.

In FIG. 15, the event visualization device 1520 includes a display device 1521, a communication circuit 1523, an input device 1525, a storage circuit 1527, and a control circuit 1529, and may generate one or more DAGs according to a plurality of activities records as a basis for diagnosing whether the target network system 102 has been hacked by the information security incident diagnosis system 1500. In this embodiment, the plurality of activities records pertain to an event cluster, which is associated with a suspicious event category, outputted by the log classification device 1510 through a clustering operation. As described above, the event visualization device 1520 may acquire the event cluster and the plurality of activities records from the log classification device 1510 through the communication circuit 1523 or the input device 1525. Similar to the storage circuit 147 in FIG. 1, the storage circuit 1527 is configured to store a graph generating program 1540. The control circuit 1529 is coupled to the storage circuit 1527, and is configured to execute the graph generating program 1540 and perform a graph generating operation on the plurality of activities records in a recursive manner to generate an HDAG. The detailed embodiment of the graph generating operation may refer to the embodiments of FIG. 6, FIG. 7, FIG. 8, and FIG. 11. The implementation of the communication circuit 1523 and the input device 1525 may correspond to the communication circuit 1513 and the output device 1515 in the log classification device 1510. This is not repeated herein again.

The display device 1521 is coupled to the control circuit 1529, and is configured to display the HDAG as a basis for diagnosing whether there are intrusions or abnormalities in the target network system 102. The HDAG is a hierarchical structure formed by connecting a plurality of common nodes and a plurality of branch nodes. Similar features of the plurality of activities records may be compressed into one node, and differential features of the plurality of activities records may be presented in a plurality of branches. In other words, the HDAG is an efficient way to present big data, to facilitate subsequent analysis programs to find out unusual signs of intrusion. In practice, the input device 1525 may be configured as a human-computer interface to allow a user to operate the information security incident diagnosis system 1500, for example, adjusting parameters or thresholds used in the operation or scaling details presented by the HDAG.

In the information security incident diagnosis system 1500 in this embodiment, the graph generating program 1540 is a computer program product stored in the storage circuit 1527, allowing the event visualization device 1520 to generate one or more HDAGs as a basis for diagnosing whether the target network system 102 has been hacked. However, it may be understood that the computer program product is not limited to be stored in the storage circuit 1527, but may be stored in the cloud and downloaded to the storage circuit 1527 as required.

The detailed operation of the graph generating program 1540 is similar to the graph generating module 155 in FIG. 1, referring to the embodiments in FIG. 6, FIG. 7, FIG. 8, and FIG. 11. The event visualization device 1520 may acquire a plurality of activities records included in an event cluster from the log classification device 1510 through the communication circuit 1523 or the input device 1525. The control circuit 1529 performs a graph generating operation on the plurality of activities records in a recursive manner to generate an HDAG. In the graph generating operation, each activities record is interpreted into a target DAG. The target DAG includes one or more nodes, each node represents a token, and each token includes one or more characters. In the graph generating operation, an HPOA operation is then performed on the target DAG and a reference DAG to obtain a merging condition of each node. Finally, in the HPOA operation, the target DAG and the reference DAG are merged into the HDAG according to the merging condition. During the iteration, the generated HDAG will be reused as a reference DAG of a next HPOA operation.

It may be understood that the activities records obtained through clustering and visualization are helpful in initially measuring the likelihood of invasive abnormalities. Therefore, the data obtained at this stage are collectively referred to as auxiliary information. However, the information security incident diagnosis system 1500 also needs to perform advanced analysis steps based on the auxiliary information to confirm the intrusion. The implementation of the advanced analysis steps may be artificial intelligence or human intelligence, which is not limited in the present invention.

In the embodiment of the information security incident diagnosis system 1500 in FIG. 15, the suspicious incident determination device 140 shown in FIG. 1 is divided into an independent log classification device 1510 and an independent event visualization device 1520 according to functions. This architecture has at least the following advantages. The performance of the information security incident diagnosis system 1500 is not limited by a single device. When the demand for data processing performance increases with the amount of data, the quantity of the log classification device 1510 and the event visualization device 1520 may be increased to perform cooperative operations with distributed computing technology. In addition, the log classification device 1510, the event visualization device 1520, the data analysis program 1530, and the graph generating program 1540 may respectively be packaged as independent products to be applied in different fields, which is not limited by the information security incident diagnosis system 1500 in this embodiment. For example, the data analysis and clustering functions provided by the log classification device 1510 may be applied not only to the field of information security, but also to gene sequencing or natural language processing programs. A visual object generator provided by the event visualization device 1520 may be applied not only to the information security incident diagnosis system 1500 in this application, but also as a blockchain user interaction interface or to assisting a user in quickly understanding complex big data correlations in the field of artificial intelligence.

Some terms are used in this specification and the scope of the patent application to refer to specific elements. A person skilled in the art may use different terms to refer to the same elements. This specification and the scope of the patent application do not use the difference in name as a way to distinguish elements, but use the difference in function of the elements as a basis for distinguishing. The "include" mentioned in this specification and the scope of the patent application is an open term, and therefore should be explained as "including, but not limited to". In addition, the term "couple" herein includes any direct and indirect means of connection. Therefore, if it is described herein that a first element is coupled to a second element, it indicates that the first element may be directly connected to the second element through electrical connection or signal connection such as wireless transmission or optical transmission, or may be indirectly electrically or signally connected to the second element through other elements or connection means.

The description of "and/or" used in this specification includes any combination of one or more of the listed items. In addition, unless otherwise specified in this specification, any term in the singular also includes the meaning in the plural.

The above are only preferred embodiments of the present invention, and all equivalent changes and modifications made according to the claims of the present invention shall fall within the scope of the present invention.

What is claimed is:

1. A log classification device, configured to adaptively cluster a plurality of activities records collected from a target network system, wherein the plurality of activities records are respectively generated by a plurality of device activity reporting programs stored in a plurality of computing devices in the target network system, according to command lines received by the plurality of computing devices; and the log classification device comprises:
    a communication circuit, configured to receive the plurality of activities records through a network;
    a storage circuit, configured to store a data analysis program;
    a control circuit, coupling the communication circuit and the storage circuit, and configured to execute the data analysis program to generate a discrete space metric tree according to the plurality of activities records and perform a clustering operation on the discrete space metric tree to generate one or more event clusters associated with one or more suspicious event categories; and
    an output device, configured to output the one or more event clusters and allow an information security incident diagnosis system to calculate similar feature information and differential feature information of a plurality of activities records in the one or more event clusters as auxiliary information for diagnosing whether there are intrusions or abnormalities in the target network system,
wherein the discrete space metric tree comprises a plurality of nodes, each node represents an activities record, and every two nodes are connected by an edge with a weighting coefficient;
the control circuit in the log classification device is further configured to perform a hierarchical similarity analysis operation to calculate a hierarchical edit distance between two to-be-analyzed activities records;
the control circuit in the log classification device is further configured to, when the discrete space metric tree is generated, perform a hierarchical similarity analysis operation on two to-be-analyzed tokens corresponding to nodes at both ends of each edge in the discrete space metric tree to generate an HED, and set the HED as a weighting coefficient of the edge; and
the hierarchical similarity analysis operation comprises:
    interpreting the two to-be-analyzed activities records into a plurality of first tokens and a plurality of second tokens;
    calculating a normalized edit distance (NED) between each first token and each second token, the NED being a numerical value between 0 and 1; and
    calculating the HED of the two to-be-analyzed activities records according to the NED between each first token and each second token.

2. The log classification device according to claim 1, wherein the hierarchical similarity analysis operation further comprises:
    calculating a longest common subsequence (LCS) value of each first token and each second token;
    calculating a root of a product of the number of characters of each first token and each second token; and
    calculating the NED according to an arccosine function of a ratio of the LCS value to the root of a product of the number of characters.

3. The log classification device according to claim 2, wherein the hierarchical similarity analysis operation further comprises:
    traversing all possible replacement combinations of the plurality of first tokens and the plurality of second tokens to find out a replacement combination with a minimum total value of all NEDs, and assigning the total value as the HED of the two to-be-analyzed activities records; and
    subtracting the HED of the two to-be-analyzed activities records from a total character number of the two to-be-analyzed activities records to calculate a similarity index of the two to-be-analyzed activities records.

4. The log classification device according to claim 3, wherein the clustering operation comprises:
    assigning a node as a reference node, starting from a root node of the discrete space metric tree;
    substituting to-be-analyzed activities records corresponding to a target node and the reference node into the hierarchical similarity analysis operation to obtain an HED and a similarity index of the target node and the reference node;
    in a case that the similarity index of the reference node and the target node meets a similarity condition, establishing a neighbor edge to connect the reference node and the target node;
    adding an expected similarity value to the HED of the target node and the reference node to obtain an upper limit of a search range;
    subtracting the expected similarity value from the HED of the target node and the reference node to obtain a lower limit of the search range;
    assigning a next node connected to an edge with a weighting coefficient that meets the search range from a plurality of edges connected to the reference node as the reference node, and recursively performing the clustering operation; and
    marking all nodes connected to the target node by neighbor edges in the discrete space metric tree as a same cluster.

5. The log classification device according to claim 2, wherein the operation of generating the discrete space metric tree further comprises: when the weighting coefficient of the edge is set, converting the HED into an integer value by rounding down or rounding as the weighting coefficient of the edge.

6. A computer program product comprising a non-transitory computer readable medium, allowing a log classification device to perform an adaptive data classification operation to generate auxiliary information for diagnosing whether there are intrusions or abnormalities in a target network system, wherein the log classification device comprises a control circuit, an output device, and a communication circuit; and the adaptive data classification operation comprises:

receiving, by using the communication circuit through a network, a plurality of activities records generated by a plurality of device activity reporting programs according to command lines received by a plurality of computing devices;

generating, by using the control circuit, a discrete space metric tree according to the plurality of activities records, wherein the discrete space metric tree comprises a plurality of nodes, each node corresponds to an activities record, and every two nodes are connected by an edge with a weighting coefficient;

performing, by using the control circuit, a clustering operation on the discrete space metric tree to generate one or more event clusters corresponding to one or more suspicious event categories; and outputting, by using the output device, the one or more event clusters, and allowing an information security incident diagnosis system to calculate similar feature information and differential feature information of a plurality of activities records in the one or more event clusters as auxiliary information for diagnosing whether there are intrusions or abnormalities in the target network system, wherein the operation of generating the discrete space metric tree further comprises:

performing a hierarchical similarity analysis operation on two to-be-analyzed activities records corresponding to nodes at both ends of each edge in the discrete space metric tree to generate a hierarchical edit distance (HED); and setting the HED as a weighting coefficient of the edge, wherein the hierarchical similarity analysis operation comprises:

interpreting the two to-be-analyzed activities records into a plurality of first tokens and a plurality of second tokens;

calculating a normalized edit distance (NED) between each first token and each second token, the NED being a numerical value between 0 and 1; and calculating the HED of the two to-be-analyzed activities records according to the NED between each first token and each second token.

7. The computer program product according to claim 6, wherein the hierarchical similarity analysis operation further comprises:

calculating a longest common subsequence (LCS) value of each first token and each second token;

calculating a root of a product of the number of characters of each first token and each second token; and calculating the NED according to an arccosine function of a ratio of the LCS value to the root of a product of the number of characters.

8. The computer program product according to claim 7, wherein the hierarchical similarity analysis operation further comprises:

traversing all possible replacement combinations of the plurality of first tokens and the plurality of second tokens to find out a replacement combination with a minimum total value of all NEDs, and assigning the total value as the HED of the two to-be-analyzed activities records; and subtracting the HED of the two to-be-analyzed activities records from a total character number of the two to-be-analyzed activities records to calculate a similarity index of the two to-be-analyzed activities records.

9. The computer program product according to claim 8, wherein the clustering operation comprises:

assigning a node as a reference node, starting from a root node of the discrete space metric tree;

substituting to-be-analyzed activities records corresponding to a target node and the reference node into the hierarchical similarity analysis operation to obtain an HED and a similarity index of the target node and the reference node;

in a case that the similarity index of the reference node and the target node meets a similarity condition, establishing a neighbor edge to connect the reference node and the target node;

adding an expected similarity value to the HED of the target node and the reference node to obtain an upper limit of a search range;

subtracting the expected similarity value from the HED of the target node and the reference node to obtain a lower limit of the search range;

assigning a next node connected to an edge with a weighting coefficient that meets the search range from a plurality of edges connected to the reference node as the reference node, and recursively performing the clustering operation; and marking all nodes connected to the target node by neighbor edges in the discrete space metric tree as a same cluster.

10. The computer program product according to claim 7, wherein the operation of generating the discrete space metric tree further comprises: when the weighting coefficient of the edge is set, converting the HED into an integer value by rounding down or rounding as the weighting coefficient of the edge.

* * * * *